US006781589B2

(12) United States Patent
Macy et al.

(10) Patent No.: US 6,781,589 B2
(45) Date of Patent: Aug. 24, 2004

(54) APPARATUS AND METHOD FOR EXTRACTING AND LOADING DATA TO/FROM A BUFFER

(75) Inventors: William W. Macy, Palo Alto, CA (US); Matthew Holliman, Sunnyvale, CA (US); Eric Debes, Santa Clara, CA (US); Yen-Kuang Chen, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 225 days.

(21) Appl. No.: 09/948,333

(22) Filed: Sep. 6, 2001

(65) Prior Publication Data

US 2003/0043156 A1 Mar. 6, 2003

(51) Int. Cl.[7] .................................................. G06F 13/00
(52) U.S. Cl. ........................................ 345/537; 345/559
(58) Field of Search ................................ 345/536, 561, 345/562, 501, 537, 531, 558, 564, 544, 555, 547, 559, 522; 382/232; 710/22

(56) References Cited

U.S. PATENT DOCUMENTS 5,572,334 A 11/1996 Tanaka
5,740,394 A * 4/1998 Minemura et al. .......... 710/310
5,857,114 A * 1/1999 Kim ............................ 710/22
6,195,741 B1 2/2001 Asato
6,247,112 B1 6/2001 Seki
6,542,541 B1 * 4/2003 Luna et al. ............ 375/240.01
2002/0144027 A1 * 10/2002 Schmisseur .................. 710/22

FOREIGN PATENT DOCUMENTS

EP 0 913 764 A1 5/1999
EP 1 154 575 A1 11/2001
WO WO 01/53934 A1 7/2001

OTHER PUBLICATIONS

Stanford Univ., "The Imagine Stream Architecture", www.archive.org, Jun. 12, 2001, pp. 1–5, XO002270839.
PCT International Search Report mailed Mar. 9, 2004 in co–pending PCT Application No. PCT/US 02/27725.

* cited by examiner

*Primary Examiner*—Kee M. Tung
(74) *Attorney, Agent, or Firm*—Blakely, Sokoloff, Taylor & Zafman LLP

(57) ABSTRACT

An apparatus and method for extracting and loading data to/from a buffer are described. The method includes the selection of data from a data buffer in response to execution of a data access instruction. The data buffer includes a plurality of data storage devices, one or more of which initially contain the selected data. Accordingly, the plurality of data storage devices form a single address space that is addressable at a bit-level. When the selected data spans from a source data storage device to a next data storage device of the data buffer, a portion of the selected data from source data storage device is concatenated with a remaining portion of the selected data from the next data storage device to form the selected data as a contiguous unit. Finally, once the selected data is formed, the selected data is stored within a destination data storage device.

35 Claims, 20 Drawing Sheets

600
START
630
EXECUTE DATA LOAD INSTRUCTION?
NO
YES
640
DATA SIZE EXCEEDS REMAINING CAPACITY OF A DESTINATION DEVICE?
NO
STORE DATA WITHIN A DATA BUFFER
650
YES
670
DIVIDE DATA INTO A FIRST PORTION AND A SECOND PORTION
672
STORE THE FIRST PORTION WITHIN THE DESTINATION STORAGE DEVICE
674
STORE SECOND PORTION OF DATA WITHIN A NEXT DATA STORAGE DEVICE OF THE DATA BUFFER
676
MOVE DATA WITHIN DESTINATION DATA STORAGE DEVICE TO A MEMORY DEVICE
RETURN

APPARATUS AND METHOD FOR EXTRACTING AND LOADING DATA TO/FROM A BUFFER

FIELD OF THE INVENTION

The invention relates generally to the field of encoding and decoding content. More particularly, the invention relates to extracting and loading data to/from a buffer.

BACKGROUND OF THE INVENTION

Media applications have been driving microprocessor development for more than a decade. In fact, most computing upgrades in recent years have been driven by media applications, predominantly within consumer segments, but also in enterprise segments for entertainment, enhanced education and communication purposes. Nevertheless, future media applications will require even higher computational requirements. As a result, tomorrow's personal computer (PC) experiences will be even richer in audio-visual effects as well as being easier to use and more importantly, computing will merge with communications.

Accordingly, the display of images, as well as playback of audio and video have become increasingly popular applications for current computing devices. Unfortunately, the quantity of data required for these type of applications tends to be very large. As a result, increases in computational power, memory and disk storage, as well as network bandwidth, have facilitated the creation and use of larger and higher quality images as well as longer and higher quality audio and video. However, content utilized by these applications is generally stored in a compressed format to conserve storage space and to reduce transmission bandwidth.

As a result, applications which support content, such as audio and video, are subject to real playback constraints imposed by audio and video data. Content such as audio and video data is generally streamed, in which transmitted content is played as it is received. In order to enable streaming, data is compressed before transmission to overcome network bandwidth limitations and to meet playback requirements. As a result, audio and video must be decoded in real time, whether they are streamed over a network or stored in a local device. In addition, computational requirements increase as the audio quality and video resolution and frame size increase. Consequently, decompression of video is one of the most computationally demanding requirements of popular applications.

Unfortunately, there is currently an imbalance between decreasing of computational costs while the costs of bandwidth and quality of service components stays stable. It is foreseeable that such an imbalance will shape the future of applications. As a result, as an ever increasing class of new algorithms and applications will be aimed to trade off the computational complexity resulting in improved audio-video quality, smaller bit rates, easy to manage tools, etc. Accordingly, this imbalance will result in new compression standards, new processing algorithms and end-to-end application paradigm where many operations in various domains will be necessary to ensure the proper delivery of multimedia from encoding and encryption to transmission, post-processing and management.

Commonly used compression algorithms such as joint photographic experts group (JPEG) and JPEG 2000 image compression, as well as motion picture expert groups (MPEG), MPEG-1, MPEG-2 and MPEG-4 audio and video compression combine two techniques. First, data is processed with a transform and then quantitized. Compression is then achieved by moving perceptionally and significant data. This technique is called lossy because original data is not exactly recovered by decompression. Results of the first step are further compressed using an entropy encoding technique. Entropy encoding replaces original data symbols (the quantitized transforms coefficients in this case) with symbols whose length depends on the frequency of the currents of the original data symbols. The most common original data symbols are replaced with short entropy encode symbols and the least common are replaced with long entropy encode symbols. Consequently, the length of entropy encode symbols vary in their bit length.

Image decode steps are executed in reverse order of the encode steps. Entropy decoding precedes transformed decoding, etc. Unfortunately, there is little data parallelism in entropy decoding due to data dependencies that result from different symbol links. Various architecture instructions are generally effective for transform operations, but tend to be of little use for entropy decoding. However, as architecture instructions increase with larger registers and new instructions, the fraction of time required for entropy decoding and media playback applications increases. Accordingly, improvements in entropy decoding lag behind those for transform decoding.

Therefore, there remains a need to overcome one or more of the limitations in the above-described existing.

BRIEF DESCRIPTION OF THE DRAWINGS

The present invention is illustrated by way of example, and not by way of limitation, in the figures of the accompanying drawings and in which.

DETAILED DESCRIPTION

A method and apparatus for extracting and loading data to/from a buffer are described. The method includes the selection of data from a bit addressable data buffer in response to execution of a data access instruction. The data buffer from which the data is selected includes a plurality of data storage devices, one or more of which initially contain the selected data. Accordingly, the plurality of data storage devices form a single address space that is addressable at a bit-level. When the selected data spans from a source data storage device to a next data storage device of the data buffer, a portion of the selected data from source data storage device is concatenated with a remaining portion of the selected data from the next data storage device to form the selected data as a contiguous unit. Finally, once the selected data is formed, the selected data is stored within a destination data storage device.

In the following description, for the purposes of explanation, numerous specific details are set forth in order to provide a thorough understanding of the present invention. It will be apparent, however, to one skilled in the art that the present invention may be practiced without some of these specific details. In addition, the following description provides examples, and the accompanying drawings show various examples for the purposes of illustration. However, these examples should not be construed in a limiting sense as they are merely intended to provide examples of the present invention rather than to provide an exhaustive list of all possible implementations of the present invention. In other instances, well-known structures and devices are shown in block diagram form in order to avoid obscuring the details of the present invention.

In an embodiment, the methods of the present invention are embodied in machine-executable instructions. The instructions can be used to cause a general-purpose or special-purpose processor that is programmed with the instructions to perform the steps of the present invention. Alternatively, the steps of the present invention might be performed by specific hardware components that contain hardwired logic for performing the methods, or by any combination of programmed computer components and custom hardware components.

The present invention may be provided as a computer program product which may include a machine or computer-readable medium having stored thereon instructions which may be used to program a computer (or other electronic devices or a system) to perform a process according to the present invention. The computer-readable medium may include, but is not limited to, floppy diskettes, optical disks, Compact Disc, Read-Only Memory (CD-ROMs), and magneto-optical disks, Read-Only Memory (ROMs), Random Access Memory (RAMs), Erasable Programmable Read-Only Memory (EPROMs), Electrically Erasable Programmable Read-Only Memory (EEPROMs), magnetic or optical cards, flash memory, or the like.

System

Figure 1:
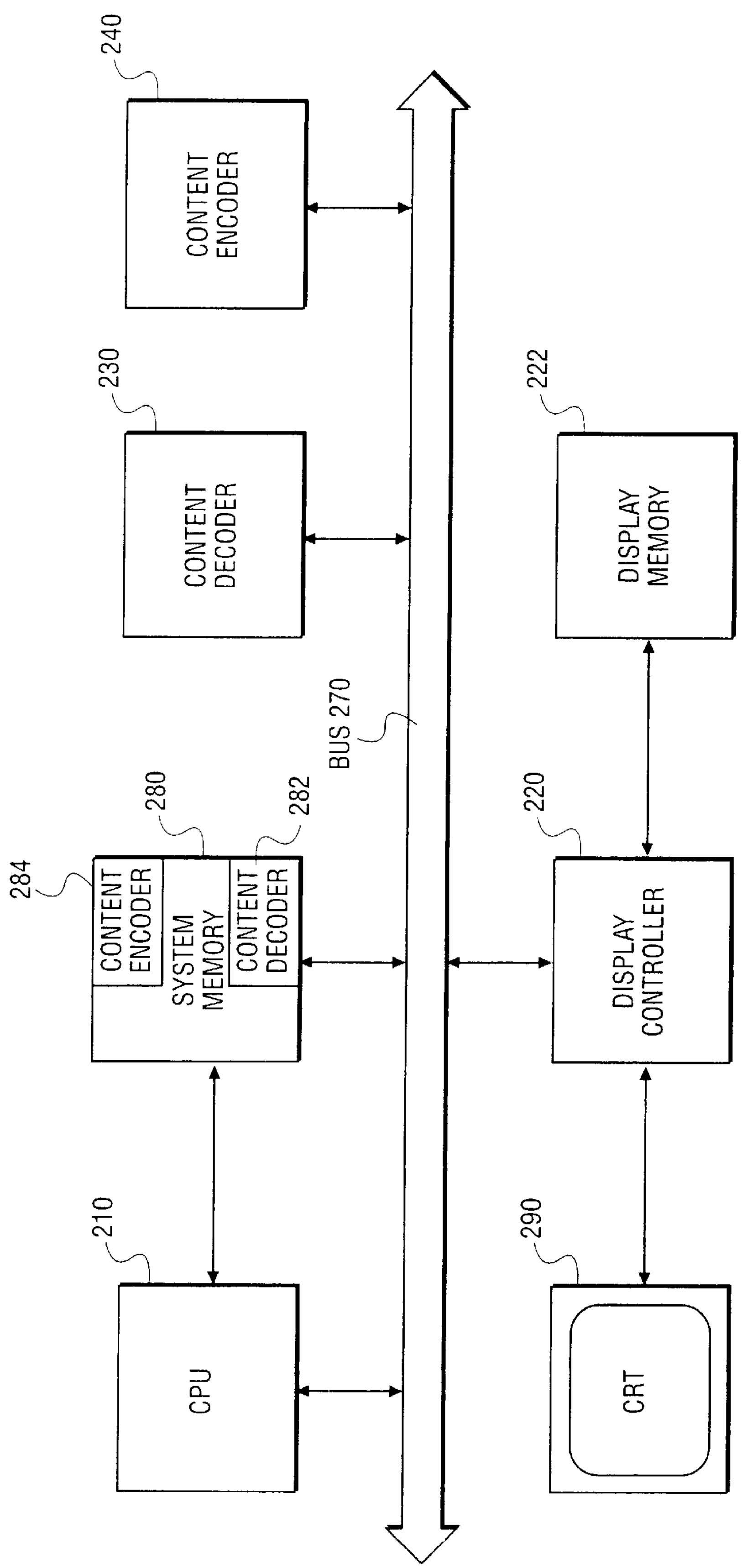
FIG. 1 depicts a block diagram illustrating a conventional computer system as known in the art and in which the teachings of the present invention may be implemented in one embodiment of the present invention.

Referring to FIG. 1, a block diagram illustrating major components of a computer system 200 in which the inventive storage format may be implemented is now described. The computer system 200 includes a display controller 220. The display controller 220 is, for example a Video Graphics Adapter (VGA), Super VGA (SVGA) or the like. Display controller 120 generates pixel data for display 290, which is, for example, a CRT, flat panel display or the like. The pixel data is generated at a rate characteristic of the refresh of display 290 (e.g., 60 Hz, 72 Hz, 75 Hz or the like) and horizontal and vertical resolution of a display image (e.g., 640×480 pixels, 1024×768 pixels, 800×600 or the like). Display controller 220 may generate a continuous stream of pixel data at the characteristic rate of display 290.

Display controller 220 is also provided with a display memory 222, which stores pixel data in text, graphics, or video modes for output to display 290. Host CPU 210 is coupled to display controller 220 through bus 270 and updates the content of display memory 222 when a display image for display 290 is altered. Bus 270 may comprise, for example, a peripheral component interconnect (PCI) bus or the like. System memory 280 may be coupled to Host CPU 210 for storing data.

Hardware content decoder 230 is provided to decode video audio, image and speech data ("content") such as, for example, motion picture experts group (MPEG) video data. MPEG video data is received from an MPEG video data source (e.g., CD-ROM or the like). Alternatively, the content decoder 230 is implemented as, for example, a conventional software decoder 282 stored in the system memory 280. Once decoded, the decoded video data is outputted to system memory 270 or directly to display memory 222.

The computer system 200 further includes a content encoder 240 which is responsible for encoding content data, such as image, audio, video and speech data, which is generated by the computer system 200. Once content is encoded by the content encoder 240, the encoded content may be stored within the system memory 280 or transmitted/streamed by the CPU 210 to a destination device, not shown. Alternatively, the content encoder 240 is implemented as, for example, a conventional software encoder 284, which may be stored in system memory 280.

Unfortunately, both the content decoder 230, as well as the content encoder 240 of the computer system 200 utilize little or no parallelism during entropy encoding and decoding, as described above, such as for example Huffman or arithmetic encoding and decoding. In fact, there is little data parallelism in entropy encoding and decoding due to data dependencies that result from different symbol lengths. Although many single instruction multiple data (SIMD) instructions are very effective for transform operations (as described above), such instructions are of little use for entropy encoding and decoding.

In addition, as the capabilities of SIMD instructions increase with larger registers and new instructions, the fraction of time required for entropy decoding as well as encoding in media playback applications increases. Consequently, improvements in entropy decoding lag behind those for transform decoding. Examples of entropy compression methods with variable length code symbols include, but are not limited to Huffman coding as well as arithmetic coding. As such, one of ordinary skill in the art will recognize that the teaching of the present invention (as will now be described) may be implemented in either software or hardware content decoders/encoders.

Figure 2:
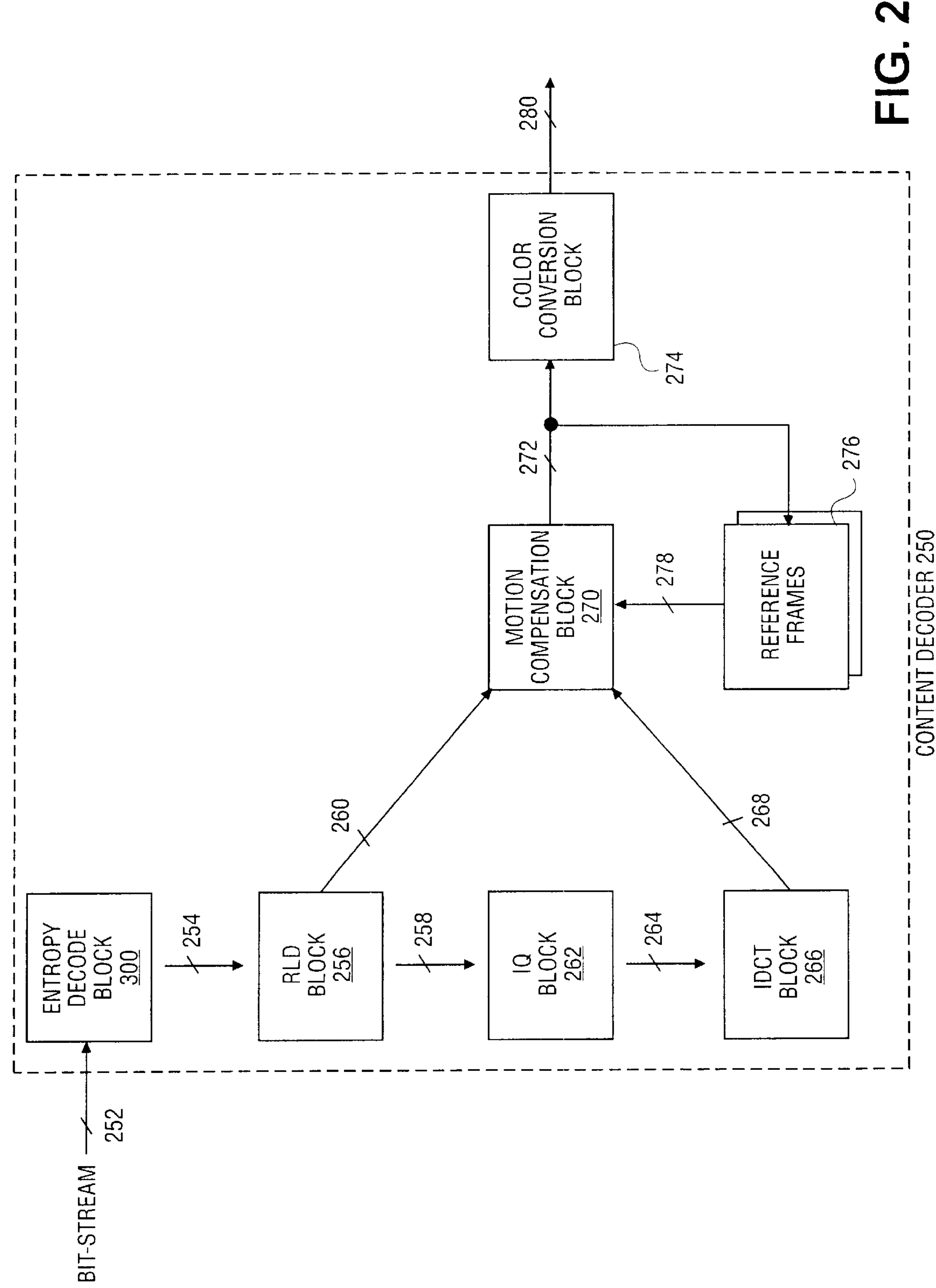
FIG. 2 depicts a block diagram illustrating a content decoder which may be utilized within the computer system as depicted in FIG. 1 in accordance with an embodiment of the present invention.

Referring now to FIG. 2, FIG. 2 depicts a portion of the components of a content decoder 250 which may be utilized within the computer system 200 in accordance with a first embodiment of the present invention. In the embodiment described, content bit stream 252, which is for example MPEG data, JPEG data or the like, is received from a content source, such as for example an MPEG data source, JPEG data source, or the like and may be decoded and decompressed as follows. Although the content decoder 250 is configured as an MPEG decoder, the embodiment as provided is an example and should not be construed in a limiting sense.

Accordingly, the content decoder 250 receives an MPEG bit stream 252 at an entropy decode block 300. However, in contrast to a conventional entropy decoder, the entropy decode block 300 utilizes a bit-level addressable buffer in order to minimize an amount of time required to decode the received bit stream 252, as described in further detail below with reference to FIG. 3A. Accordingly, the entropy decode block 300 determines a decode symbol as well as a decode symbol length for the received bit stream 252, which is provided to the run length decode block 256.

The RLD block 244 receives the decode symbol and decode symbol length from the entropy decode block 300 in order to generate a quantized block 258 that is provided to an inverse quantitization block (IQ block) 262. The IQ block 262 performs inverse quantitization on the quantized block 258 to generate a frequency spectrum 264 for the quantized block. Next, an inverse discrete co-sign transform (IDCT block) 266 performs inverse discreet co-sign transformation of the quantized block 258 using the frequency spectrum 264 to generate a decoded block 268

Once generated, the decode block 268 is provided to a motion compensation block (MCB) 270. Motion compensation is then performed by the MCB 270 to recreate the MPEG data 272. Finally, color conversion block 274 converts the MPEG data 272 to the red, green, blue (RGB) color space in order to generate pictures 280. However, in contrast to conventional content decoders such as hardware decoder 230 or software content decoder 282 of the computer system 200 as depicted in FIG. 1, the content decoder utilizes an entropy decode block 300, which is further described with reference to FIG. 3A.

Figure 3A:
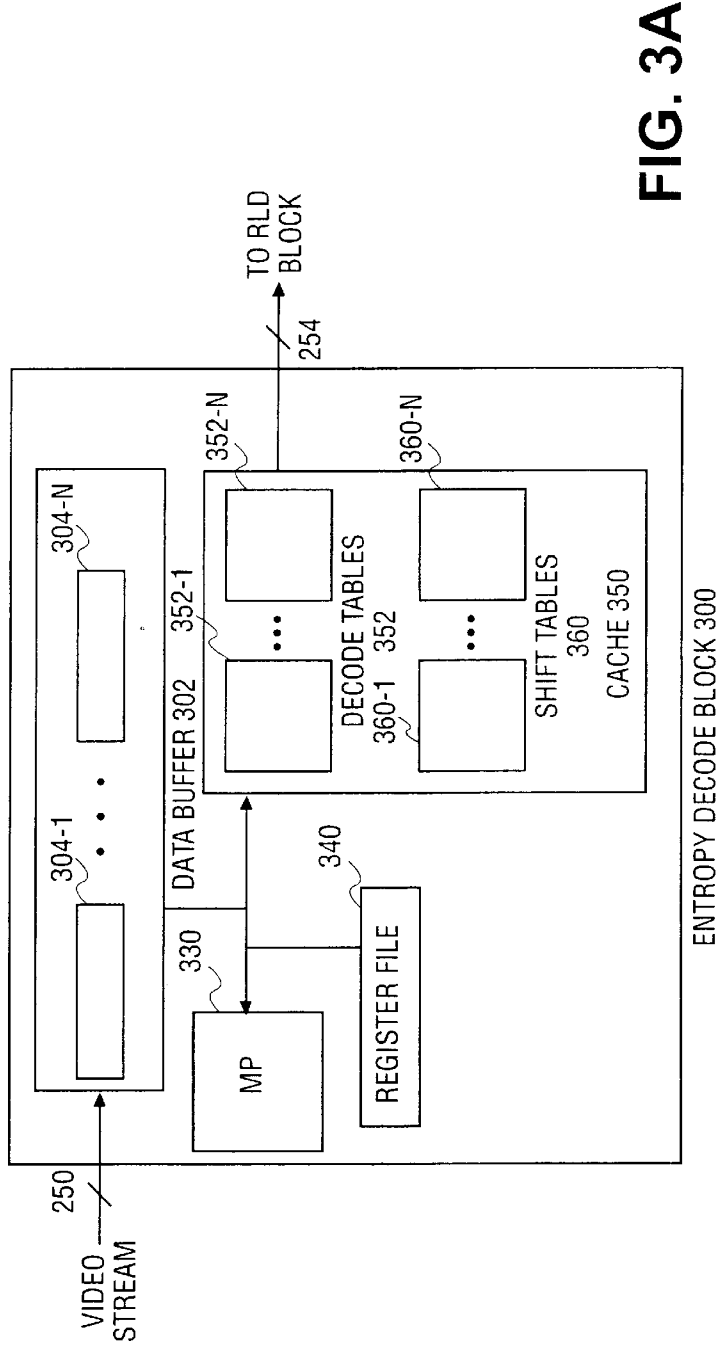
FIG. 3A depicts a block diagram illustrating an entropy decode block of the content decoder as depicted in FIG. 2 in accordance with a further embodiment of the present invention.

Referring now to FIG. 3A, the entropy decode block 300 utilizes a data buffer 302, which includes a plurality of data storage devices 304 (304-1, . . . 304-N). In one embodiment, the data buffer 302 utilizes bit-level addressable registers which may include 128 bit MMX registers. However, those skilled in the art will appreciate that the data storage devices of the data buffer 302 are not limited to registers and generally include any data storage device capable of storing digital data. As such, as bit stream data 250 is received, the bit stream data 250 is loaded within the plurality of data storage devices 304 of the data buffer 302.

Unfortunately, the encoded bit stream 250 utilizes encode characters of varying lengths. As described above, entropy encoding replaces original data symbols with encode symbols whose length depends on the frequency of occurrence of the original data symbols, such that the most common original symbols are replaced with short entropy encode symbols and the least common are replaced with long entropy encode symbols. As such, data must be selected from the data buffer in order to capture an encode symbol which is of a varying length.

Figure 3B:
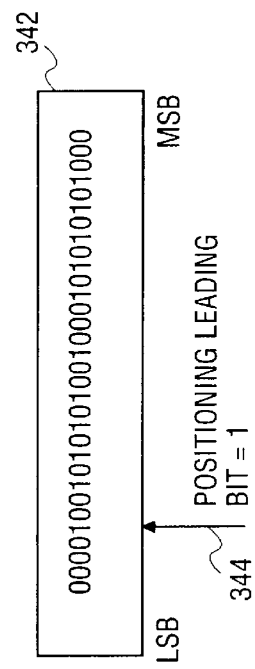
FIG. 3B depicts a destination data storage device in accordance with a further embodiment of the present invention.

Consequently, delays in capturing encode symbols of varying lengths cause a bottleneck during entropy encoding within conventional decoders. As such, the entropy decode block 300 utilizes a bit-level addressable buffer, which is capable of capturing portions of data that span between the various data storage devices of the data buffer 302 in order to capture the varying length encode symbols utilized. As such, the entropy decode block may select a portion of data within a source data storage device 304 of the data buffer 302 and store the portion of data within a destination data storage device 342 as depicted in FIG. 3B, which may be located within the register file 340 of the entropy decode block 300.

Accordingly, utilizing the teachings of the present invention, the processor 330, in response to executing a data detection instruction may determine a position of a leading one within the destination data storage device. Once this position is determined, the processor 330 may, in one embodiment, utilize a shift table 360 (360-1, . . . , 360-N) within a cache 350 of the entropy decode block 300. As such, the processor 330 may read the shift table 360 to get the shift value using the leading one position as an index. Once the shift value is determined, the destination data storage device 342 may be, for example, right-shifted according to the shift value. Once right-shifted, the processor can read a decode symbol from a decode table 352 (352-1, . . . , 352-N) of the cache 350 in order to determine a decode symbol based on a value of the shifted data storage device 342.

Finally, a decode symbol length is read from a decode table 352 using the value of the right-shifted destination data storage device 342. Accordingly, using the bit-level addressable buffer, the entropy decode block is able to determine code words or symbols within the data storage devices with minimal overhead. In other words, in contrast to conventional entropy decoders, the entropy decode block 300 avoids many of the tests utilized by conventional entropy decoders for determining a position of the leading one, which often results in substantial delays during entropy decoding within a content decoder. In addition, once the encode symbols are determined, in one embodiment a pointer is used to indicate a start position of the next encode symbols or codeword based on the codeword length.

Referring again to FIG. 3A, in an alternate embodiment the cache 350 includes only decode tables 352 and does not utilize shift tables 360. Accordingly, in the embodiment described, the decode tables may include a level or magnitude value, a run length value to a next non zero value, and a length of the code word. Consequently, when a portion of video stream data is read from a data storage devise 304 within the data buffer 302, a mask may be applied to the selected portion of data in order to extract look-up data from the selected portion of data.

As such, utilizing the look-up data, the decode tables 352 are queried until a corresponding entry is detected within one of the decode tables 352. In one embodiment, when the bit length of the lookup data is less than the codeword length, the encode table returns an invalid response. Accordingly, additional bits are added to the lookup data and applied to the decode table 352 until a valid entry is returned. Therefore, once located, the selected portion of data is decoded using the level/magnitude value, the run length value, and the code word value provided by the decode table 352. In addition, once the encode symbols are determined, in one embodiment a pointer is used to indicate a start position of the next encode symbols or codeword based on the codeword length.

Figure 4:
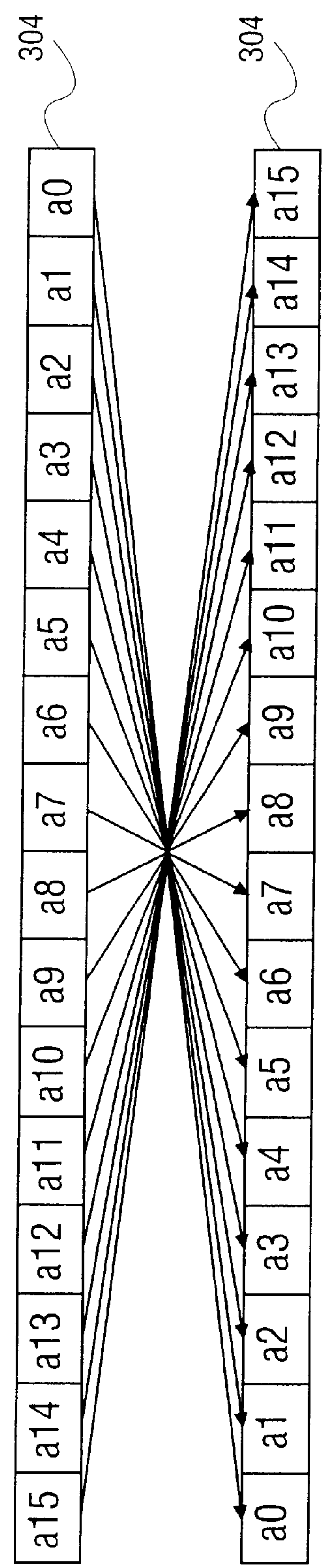
FIG. 4 depicts a block diagram illustrating data conversion within a data storage device in accordance with the further embodiment of the present invention.

Referring now to FIG. 4, FIG. 4 depicts data conversion within a data storage device 304 of the data buffer 302. In the depicted example, data within the data storage device 304 may initially be stored in little endian order. The initial ordering of the data is generally based on a methodology for organization of data within the respective computing architecture. Unfortunately, MPEG, the most common video format, organizes data in big endian order. As a result, decoding of MPEG data requires conversion from little endian order to big endian order. Alternatively, the data may initially be stored in big endian order, thereby avoiding the conversion.

Consequently, data within the data storage device 304 is reversed in response to execution of a data conversion command. As such, in the embodiment described, the order of bytes is reversed by single instruction for each size of register. However, in an alternative method, the order of bytes is reversed within a 32-bit registers in a single instruction. Consequently, 32-bit words, whose bytes have been swapped in 32-bit registers, are loaded in larger registers. Once loaded, the order of these 32-bit words is reversed with a single instruction.

Referring now to FIGS. 5A–5D, FIGS. 5A–5D depict the data buffer 302 of the entropy encode block 300 utilizing a source data storage device (R0) 304-1 and a secondary data storage device (R1) 304-2. As described, the various data storage devices 304 of the data buffer 302 provide bit-level address capability, which may be utilized for expediting both encoding and decoding of content data. Accordingly, the R0 data storage device 304-1 is initially loaded with bit stream data. Once the R0 data storage device is filled to capacity, the R1 data storage device 304-2 is then stored with bit stream data. As such, in the embodiment described, both the R0 and R1 data storage devices contain unread bit stream data.

Figure 5A:
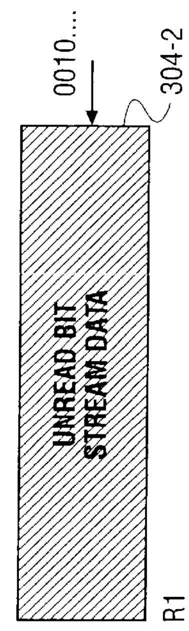
FIGS. 5A–5D depict a block diagram illustrating reading of data from one or more storage devices of a data buffer in accordance with a further embodiment of the present invention.
Figure 5B:
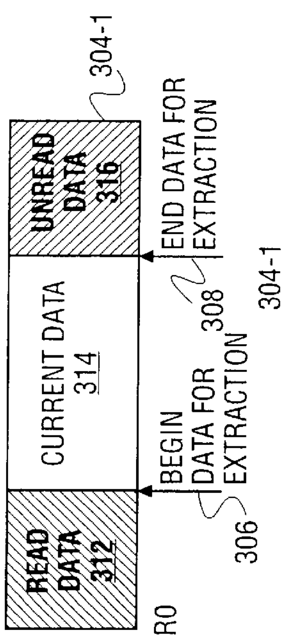

Referring now to FIG. 5B, FIG. 5B depicts the R0 and R1 data storage devices, illustrating data that is accessed on bit boundaries. As a result, bits are the units that define the amount of data to access within the data buffer 302. Consequently, the smallest difference between access addresses of the data storage devices is one bit. Accordingly, in the embodiment described, the data buffer 302 includes a plurality of bit-level addressable registers. However, those skilled in the art will appreciate that other forms of hardware, which are capable of holding data, may be utilized as the bit-level addressable data storage devices.

Consequently, the initial bit address 306 of the R0 data storage device 304-1 is provided at which current data 314 is selected and based on the number of bits to be read, the end position 308 of the requested data can be calculated. In addition, in one embodiment, the data storage devices include a flag 310 for determining whether each portion of bit stream data within the respective data storage device has been accessed. As such, referring to the R0 data storage device 304-1, the R0 device 304-1 includes read data 312, current data 314 and unread data 316.

Figure 5C:
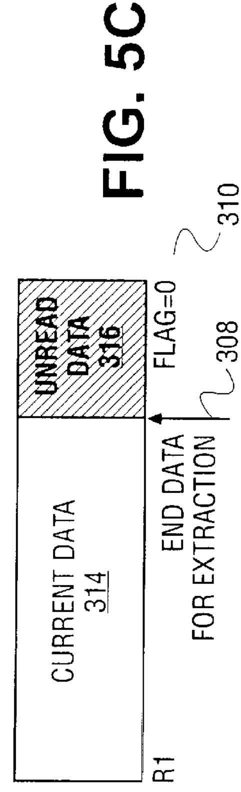

Referring now to FIG. 5C, FIG. 5C depicts an embodiment of the data buffer 302 when the requested data spans multiple data storage devices (from $R_0$ to $R_1$). When such a case is detected, a register merger operation is performed. Accordingly, in response to execution of the register merge instruction, current data from the R0 data storage device is read and current data from the R1 data storage device is read and copied to the destination data storage device as a contiguous unit. In the embodiment described, the destination data storage device is a register which may be contained within register file 340 of the entropy encode block 300 depicted in FIG. 3A. However, the destination data storage device can be any type of hardware capable of holding digital data.

In an alternate embodiment, in response to detection of a data span, unneeded or read data within the R0 data storage device may be shifted out to make room for data which spans into the R1 data storage device. Once the unread data is shifted out of the R0 data storage device, current data within the R1 data storage device may be shifted within the R0 data storage device. Consequently, once the current data is contained within the R0 data storage device, the data may be copied to the destination data storage device as a contiguous unit. Once copied, all data within the R0 data storage device is unneeded read data, and therefore the R0 data storage device can be loaded with fresh data.

Figure 5D:
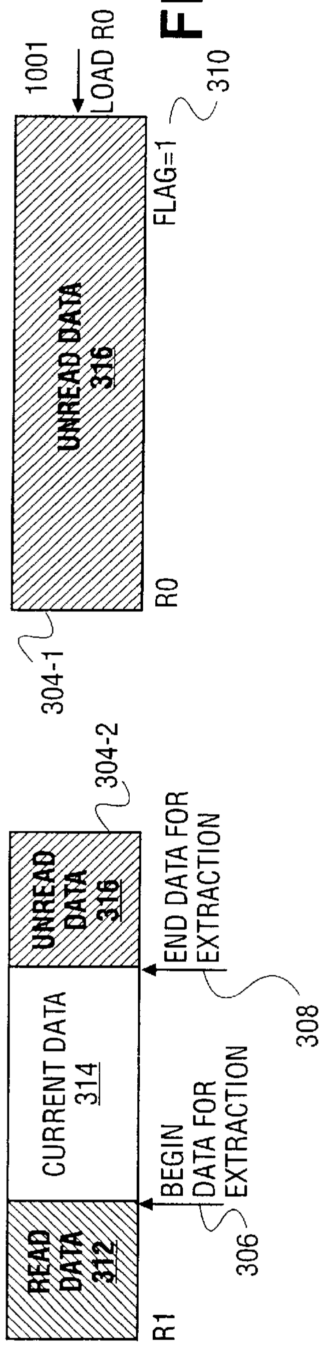

Referring now to FIG. 5D, FIG. 5D depicts an embodiment where the data buffer 302 functions as a circular buffer. As such, once the current data span is selected from the R0 data storage device 304-1 and the R1 data storage device 304-2, the R0 data storage device 304-1 will no longer contain unread data. Accordingly, as depicted in FIG. 5D, all data within the R0 data storage device has been accessed, which results in setting of the flag 310. In addition, in the embodiment described, the position of R0 data storage device 304-1 is moved to an end of the buffer 302 in order to enable loading of data within the R0 data storage device from the input data stream. Consequently, in the embodiment described, the data buffer functions as a circular buffer. In other words, in the example provided, all of the data in the next access is selected from the R1 data storage device 304-1.

However, in some embodiments, data accesses will overlap such that some bits are accessed more than once, while in other cases some bits are not accessed at all. As such, in the embodiments described, the method of specifying the address of desired data to be accessed within the data buffer 302 is provided by receiving a first register ID, which may consist of the register number type in which the first bit of the access occurs. The method also includes the bit address given by the bit position in the register, the number of bits to be accessed and (in most cases) a second register in which some of the access data is located if the range of access bits extends beyond the initial source register.

In the embodiment described, the start bit position (306) of the current data and the number of bits to be extracted are kept in two additional registers (not shown). However, in an alternate embodiment, specification of the data to be accessed is provided by receiving a first bit 306 and a last bit address 308 instead of a first bit address 306 and the number of bits of the access data. The last bit address 308 may be associated with the register ($R_1$ 304-2) that holds the last bit, but may be associated with the first register ($R_0$ 304-1), in which case it is equal to the sum of the first bit address and the number of bits to be accessed. In the latter case, the last address 308 may refer to a position in another register ($R_1$ 304-2) if the last bit address 308 is beyond the highest address of the first register ($R_1$ 304-1). In this case, there is effectively a single address space in the buffer.

As such, accessed data is transferred to a destination register 342, as depicted in FIG. 3B. The destination register 342, or data storage device 304, may be of the same or different type of register from the data storage devices 304 of the data buffer 302. In one embodiment, accessed data is loaded to the lowest or least significant position in the register (see FIG. 3B). In addition, when data access is requested, requiring a register merge instruction, the data is concatenated so that the contiguous unit of data is loaded in the destination data storage device 342.

In many cases, data that is accessed from the data buffer 304 will not fill the destination data storage device 342. In these cases, the destination data storage device 342 is zero extended so that bits in the destination register 342 that are not part of the accessed data are set to zero. Zero extension of the destination data storage device 342 is, in one embodiment, performed by the data load instruction that loads the destination data storage device 342 from data within the data buffer (see FIG. 3B). In addition, when the flag 310 is set, indicating that all data within a respective data storage device has been accessed, the flag is reset when an instruction to load additional data into the data buffer is executed. As such, the processor does not wait for data to be loaded to set the flag.

However, in an alternative embodiment, determining that all of the data in a register has been accessed is performed by comparing the highest address in the register (MSB position within the register) with the sum of the address (bit location) of the first bit accessed 306 and the number of bits to be accessed. As such, all data has been accessed from the register if this sum is greater than the highest register address (MSB position). Accordingly, in the embodiment described above, when all data within a register has been accessed, data from the bit stream 252 is loaded into the register and the register is moved to the end of the buffer so that newly loaded data is accessed after other data currently in the buffer.

Finally, the bit addressable data buffer 302 supports software optimizations such as loop and roll functions. As such, the loop may be enrolled so that it is not necessary to check, after decoding every symbol, whether all data within a register has been accessed. Accordingly, the number of times a loop can be statically unrolled equals a register bit length (number of registers in the buffer less one) divided by the maximum number of bits buffer access. For example, if the buffer length is 128-bits and the number of registers in the buffer is two, then there are guaranteed to be $128\times(2-1)$, which equals 128 bits in the buffer. Consequently, if the maximum number accessed is 17 bits, then the buffer will never run out of data after 128 divided by 17, which equals 7 requests. Accordingly, the buffer can be unrolled seven times.

Figure 6:
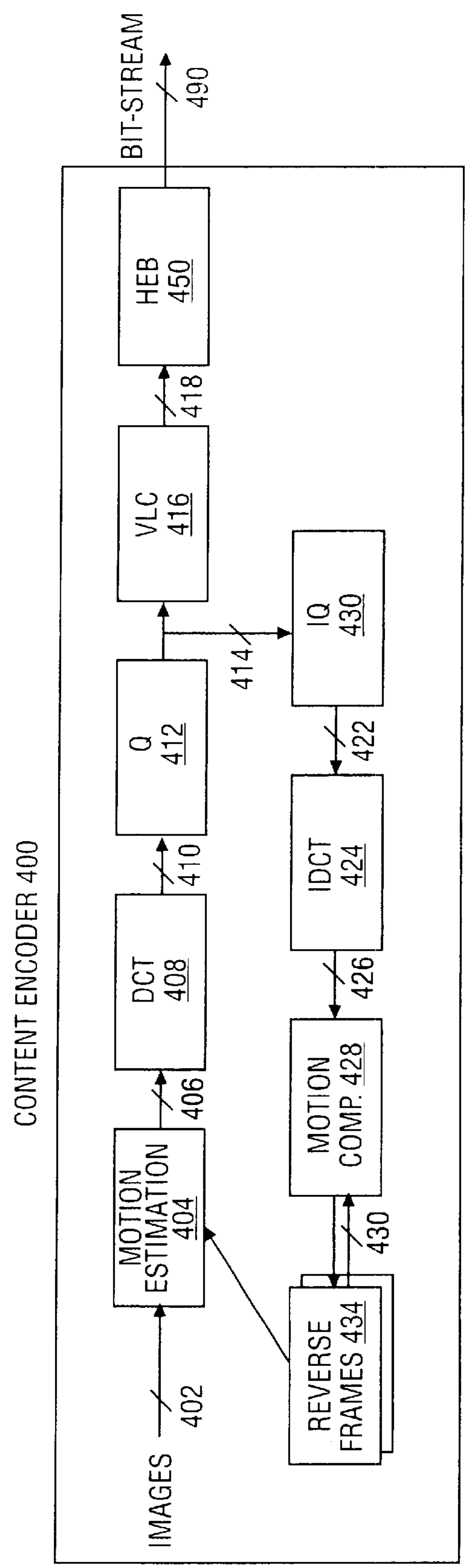
FIG. 6 depicts a block diagram illustrating a content encoder, which may be utilized within the computer system as depicted in FIG. 1 in accordance with a further embodiment of the present invention.

Referring now to FIG. 6, FIG. 6 depicts a block diagram illustrating components of a content decoder 400, which may be utilized within the computer system 100 in accordance with a further embodiment of the present invention. The content decoder 400 initially receives 402 content data, such as images, audio, and video data. Accordingly, for each block of data within the image stream 402, the encoder 400 performs five steps to produce an encoded block. In the first stage, motion estimation is performed by the motion estimation block 404 to take advantage of temporary redundancies among images. Accordingly, the motion estimation block 406 generates a motion vector for each block within a macro block of the content data 402, which is provided to the discreet co-sign transform (DCT block 408).

As such, the DCT block 408 takes the original blocked data and performs a discreet co-sign transform on the block to find its frequency spectrum. This frequency spectrum 410 is provided to the quantization block 412. The quantization block 412 zeroes out many of the smaller values of the received frequency spectrum, thereby reducing the number of distinct frequency values within the frequency spectrum. This quantization step is the "lossy" step of the encoding process and the degree of quantization is specified using both quantization matrices and quantization coefficients.

Following quantization, run length and entropy encoding are performed, utilizing a quantized block 414 received from quantization block 412. The run length encoding block (RLC block 416) encodes non-zero elements and the number of zeroes between them in order to further compress the content data 402. Finally, the entropy decode block 450 determines a variable length code and a variable length code size from the received run length encoded data in order to generate the encoded bit stream 490. However, in contrast to conventional entropy encoders, entropy encode block 450 utilizes a bit-level addressable data buffer 480, as described above, in order to store encoded data symbols prior to storage of the encoded data symbols within, for example, a memory device as depicted in FIGS. 7A and 7B.

Figure 7A:
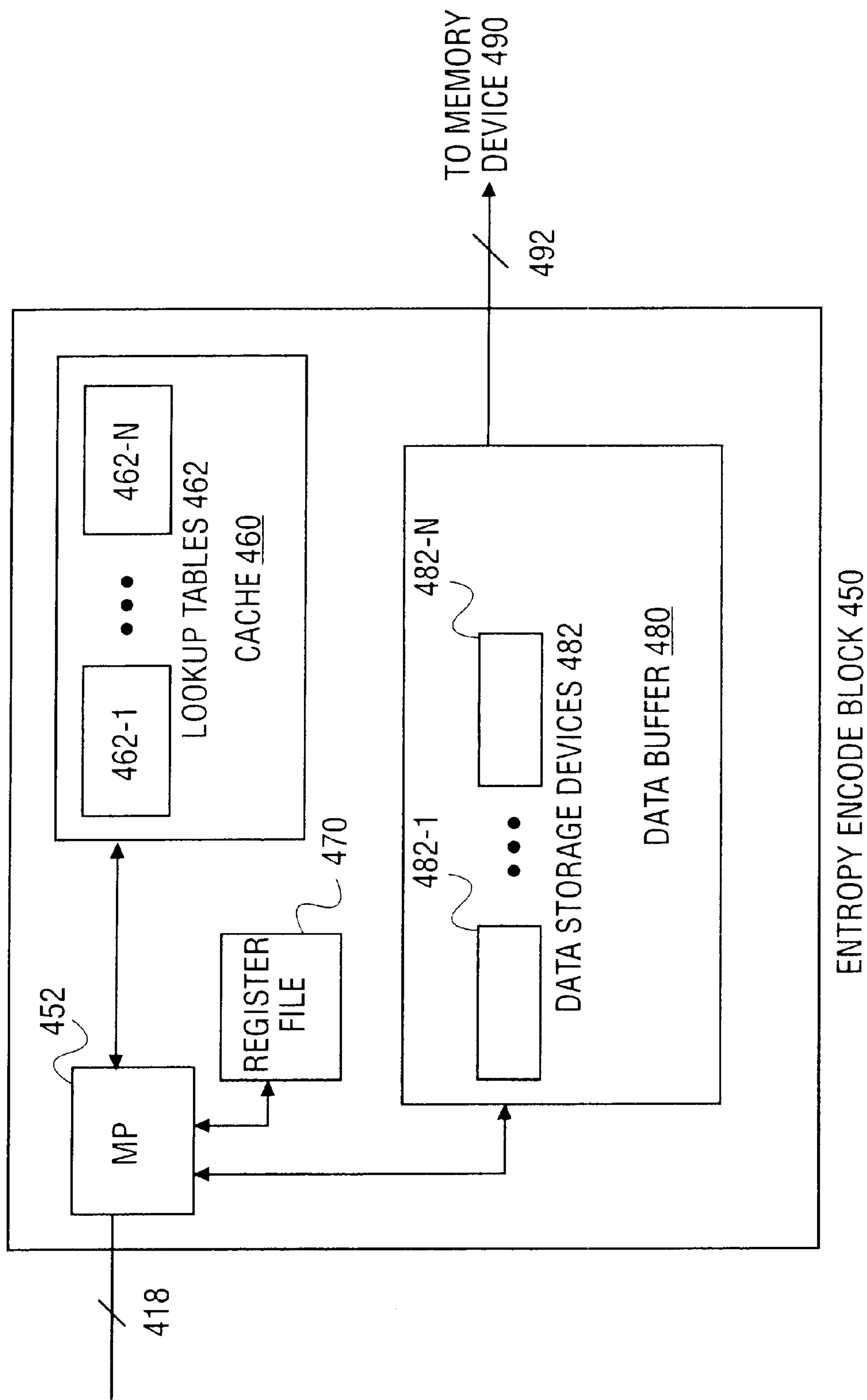
FIGS. 7A and 7B depict a block diagram illustrating an entropy encode block as depicted in FIG. 6 in accordance with a further embodiment of the present invention.

Referring now to FIG. 7A, FIG. 7A depicts an entropy encode block in accordance with an exemplary embodiment of the present invention. The entropy encode block 450 includes a microprocessor 452, which reads or receives a value which is to be encoded. In the case of MPEG, two values are received, which include the level and run-length, which are to be encoded. Using the values obtained, the processor utilizes a look-up table 462 in order to determine a variable length code and a variable length code size for the received data. As such, once the variable length encode symbol and the variable length code size are determined, the entropy encode block 450 may store the encoded symbols within the data buffer 480. As such, the encode symbols are encoded within data storage devices 482 (482-1, . . . 482-N) until the data buffer 480 is full.

Figure 7B:
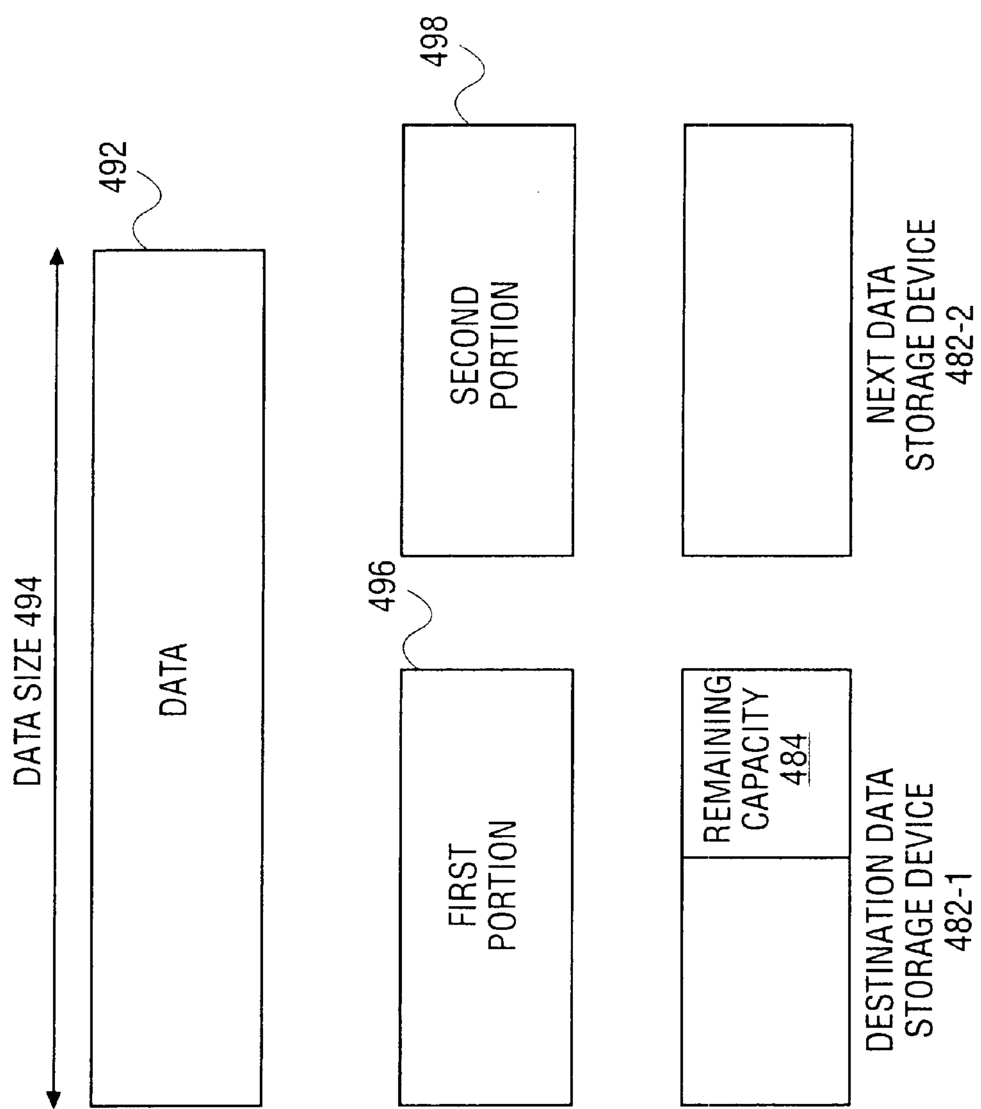

However, utilizing the techniques described above, the data buffer, although utilizing a plurality of data storage devices includes a single address space, such that when storing of data 494 within a data storage device of the data buffer is complete, additional data or encode symbols are separated into a first portion 496 (stored within 482-1) and a second portion 498 and provided within a next data storage device 482-2 as depicted in FIG. 7B. Accordingly, the data storage devices 482 utilize a pointer, which tracks the next bit position within which data may be stored. In addition, once a data storage device is filled, the data storage device symbols may be moved to memory and as described above, the data storage device may be moved to a final position within the data buffer such that it may be utilized to store additional encoded data symbols, while other data is written to memory.

In one embodiment, the registers 482 within the data buffer 480 are named so that they have the same position in the buffer. Accordingly, when the data buffer is accessed by a destination register, data within a data store register 482-1 of the data buffer 480 is stored in the destination register while a data load register 482-2 of the data buffer 480 is loaded from memory. In the case in which a storage register writes in the data buffer 480, data is stored into a data store register 482-1 of the data buffer 480, while data within a data load register 482-2 is loaded into memory. Accordingly, the physical registers are switched between load and store registers to enable continuous writes or stores to the data buffer for example as depicted in FIG. 5D. Procedural methods for implementing the teachings of the present invention are now described.

Operation

Figure 8:
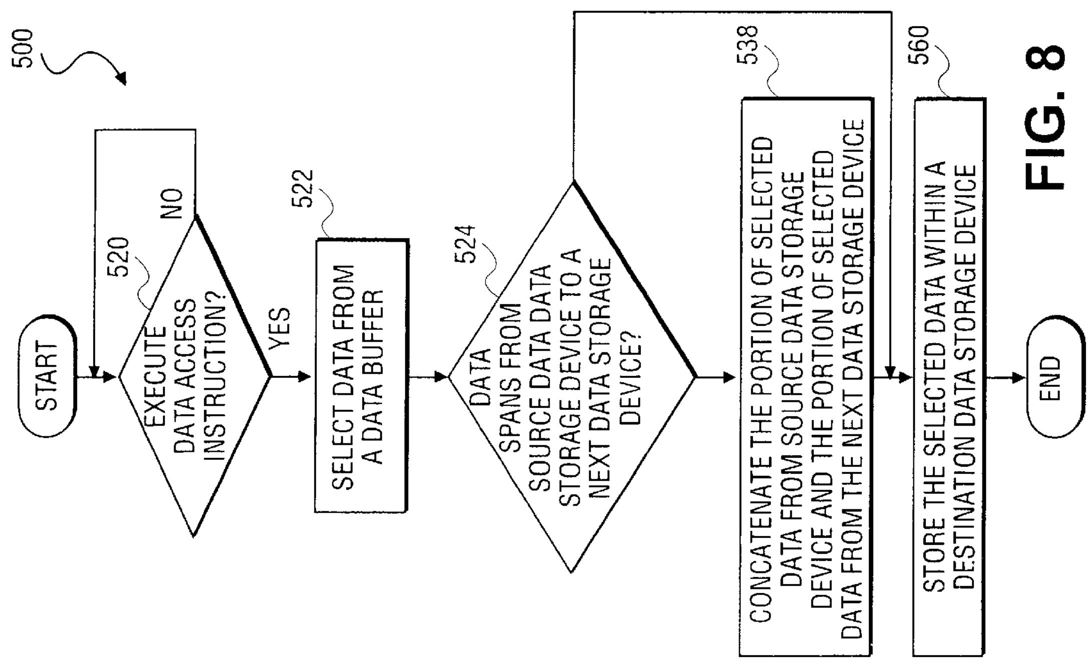
FIG. 8 depicts a flow chart illustrating a method for accessing data from a data buffer in accordance with an embodiment of the present invention.

Referring now to FIG. 8, FIG. 8 depicts a flow chart illustrating a method 500 for retrieving data from a bit-level addressable buffer 302, for example as depicted in FIG. 3A. At process block 520, it is determined whether a data access instruction has been executed. In response to execution of a data access instruction, data is selected from the data buffer 302 at process block 522. Next, at process block 524, it is determined whether data spans from a source data storage device 304-1 to a next data storage device 304-2 within the data buffer 302 (See FIG. 5C). When a data span is detected, process block 538 is performed. Otherwise, control flows to process block 560. At process block 538, the portion of the selected data from the source data storage device 304-1 and the portion of selected data from the next data storage device 304-2 are concatenated to form the selected data as a contiguous unit. Finally, at process block 560, the selected data is stored within a destination data storage device 342.

Figure 9:
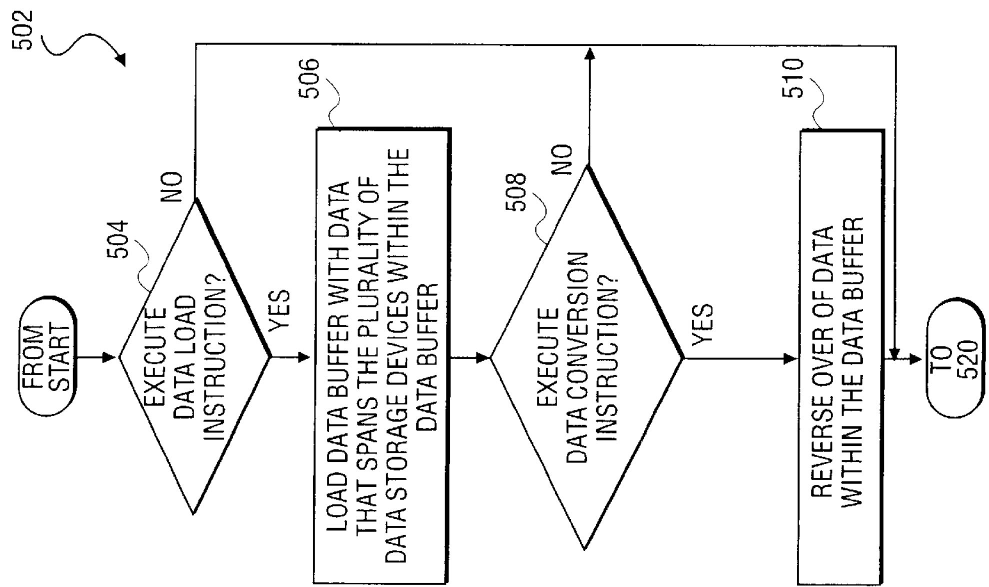
FIG. 9 depicts a flow chart illustrating an additional method for loading data within a data buffer in accordance with a further embodiment of the present invention.

Referring now to FIG. 9, FIG. 9 depicts a flow chart illustrating an additional method 502 for loading input bit stream data within the data buffer 302 (See FIGS. 5A–5D). As such, at process block 504, it is determined whether a data load instruction has been executed. In response to execution of a data load instruction, data is loaded within the data buffer 302 that spans the plurality of data storage devices within the data buffer at process block 506. Accordingly, as described above, the data buffer utilizes a plurality of data storage devices, which in one embodiment are 128 bit registers. In addition, the register merger functionality described above allows the data buffer to perform as a single address space, which enables data to span one or more of the registers within the data buffer.

Once the data buffer is loaded, process block 508 is performed. At process block 508, it is determined whether a data conversion instruction has been executed. Accordingly, in response to execution of a data conversion instruction, an order of data is reversed within the data storage devices 304 of the data buffer 302 at process block 510 (See FIG. 4). Once complete, control flow branches to process block 520 of FIG. 8. In the embodiments described above, data conversion includes conversion from little endian order to big endian order. However, data conversion is not limited to the example described.

Figure 10:
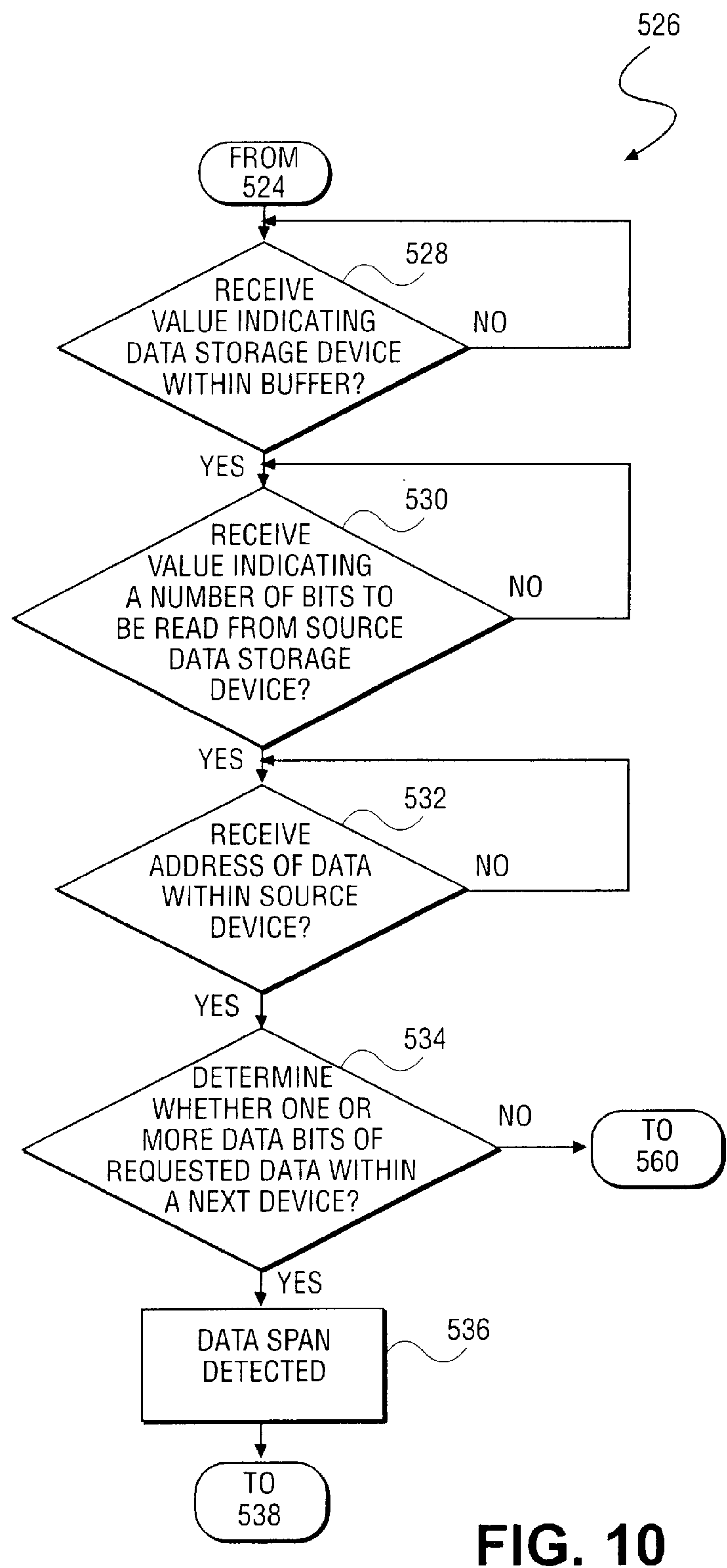
FIG. 10 depicts a flow chart illustrating an additional method for detecting whether requested data spans one or more data storage devices of a data buffer in accordance with a further embodiment of the present invention.

Referring now to FIG. 10, FIG. 10 depicts a flow chart illustrating an additional method 526 for detecting a data span (See FIG. 5C). Accordingly, at process block 528, a device value is received indicating a data storage device 304-1 within the data buffer 302. Once received, at process block 530, a bit-value is received indicating a number of bits to be read from a source data storage device 304-1. Finally, at process block 532, an address 306 of the requested data within the source data storage device 304-1 is received. Finally, at process block 534, it is determined whether one or more bits of the requested data 314 are within a next data storage device 304-1 at the data buffer 302.

As described above, techniques for determining the data span include comparing a remaining capacity of the source data storage device 304-1 against a received bit-value indicating a number of bits of the requested data 314. As such, when the number of bits exceeds the remaining capacity, data spans to a next data storage device. Alternatively, a start address 306 for the requested data and a stop 308 for the requested data may be received, such that when the start address 306 and the stop address 308 refer to different data storage devices, a data span is detected. When a data span is detected, control flow branches to process block 538 of FIG. 8. Otherwise, control flow branches to process block 560 of FIG. 8.

Figure 11:
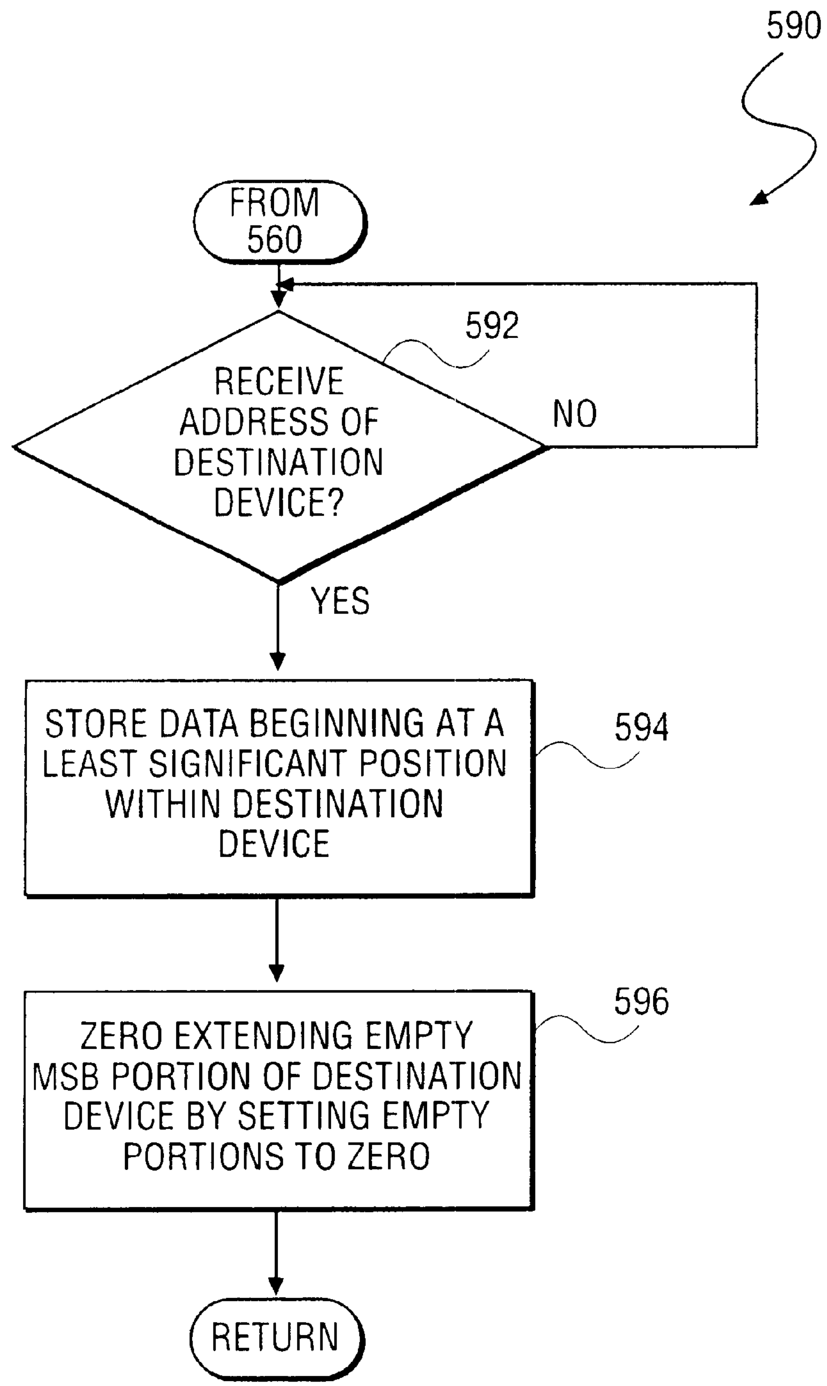
FIG. 11 depicts a flow chart illustrating an additional method for storing data within a destination data storage device in accordance with a further embodiment of the present invention.

Referring now to FIG. 11, FIG. 11 depicts a flow chart illustrating an additional method 590 for storing selected data (See FIG. 3B). As such, at process block 592, an address of a destination data storage device is received. Once received, at process block 594 data is stored within the destination data storage device 342, beginning at a least significant position (LSB). Finally, at process block 596, zero extending of empty most-significant bit portions (MSB) of the destination data storage device 342 is accomplished by setting empty portions to zero.

Figure 12:
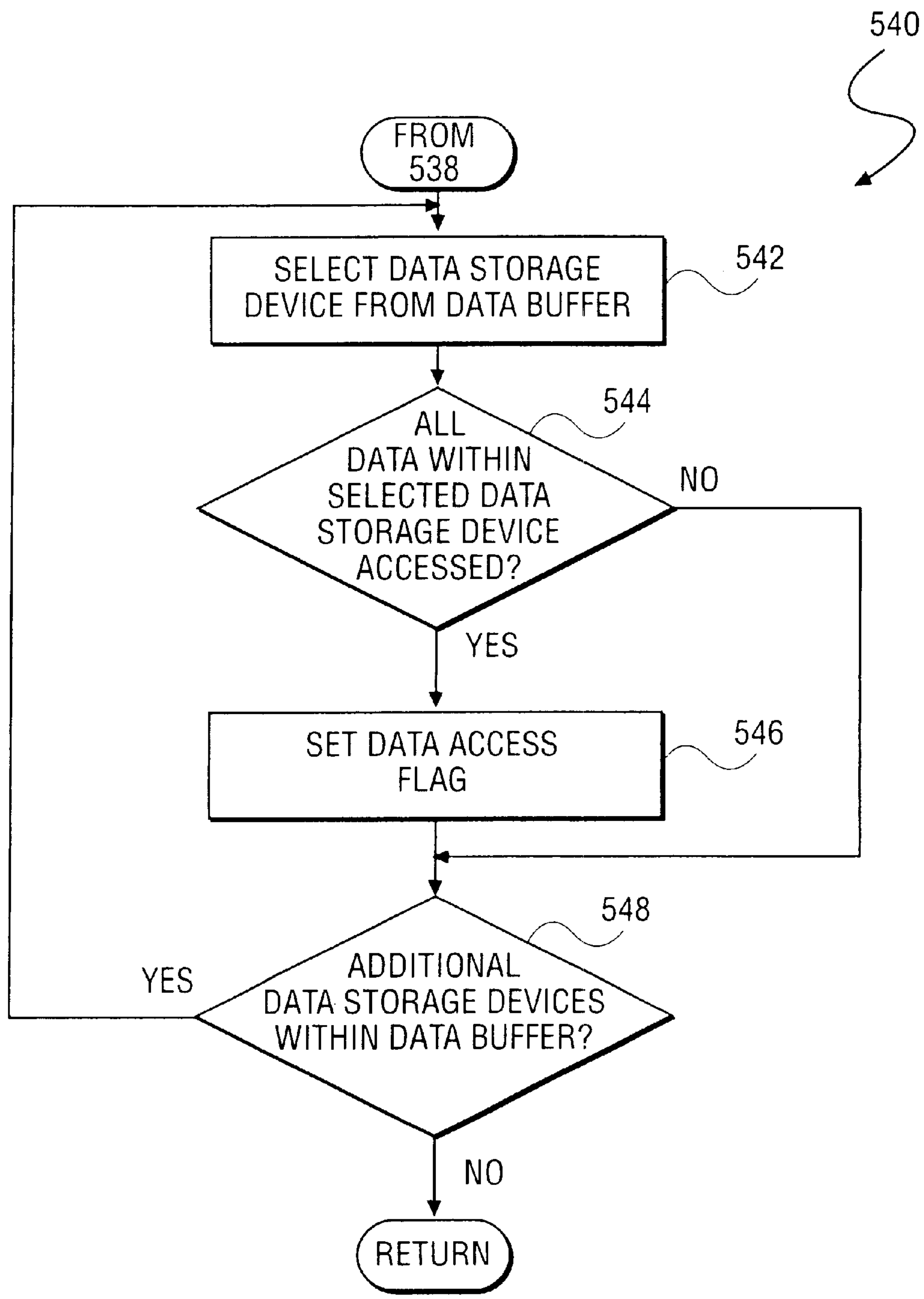
FIG. 12 depicts a flow chart illustrating an additional method for concatenating data that spans one or more data storage devices of a data buffer in accordance with an exemplary embodiment of the present invention.

Referring now to FIG. 12, FIG. 12 depicts a flow chart illustrating an additional method 540 for concatenating or performing a register merge of data that spans one or more data storage devices (See FIG. 5C). At process block 542, a data storage device 304-1 is selected from the data buffer 302. At process block 544, it is determined whether all data within the selected data storage device is accessed. In one embodiment, this determination is based on the access flag 310 as depicted in FIGS. 5A–5C. In an alternate embodiment, the determination is made by accessing whether the start data pointer 306 and the end data pointer 308 are within the same register. When such is not the case, a data scan is detected. When all data within the selected data storage device is accessed, at process block 546, the data access flag is set. Finally, at process block 548, process blocks 542–546 are repeated for each data storage device within the data buffer.

Figure 13:
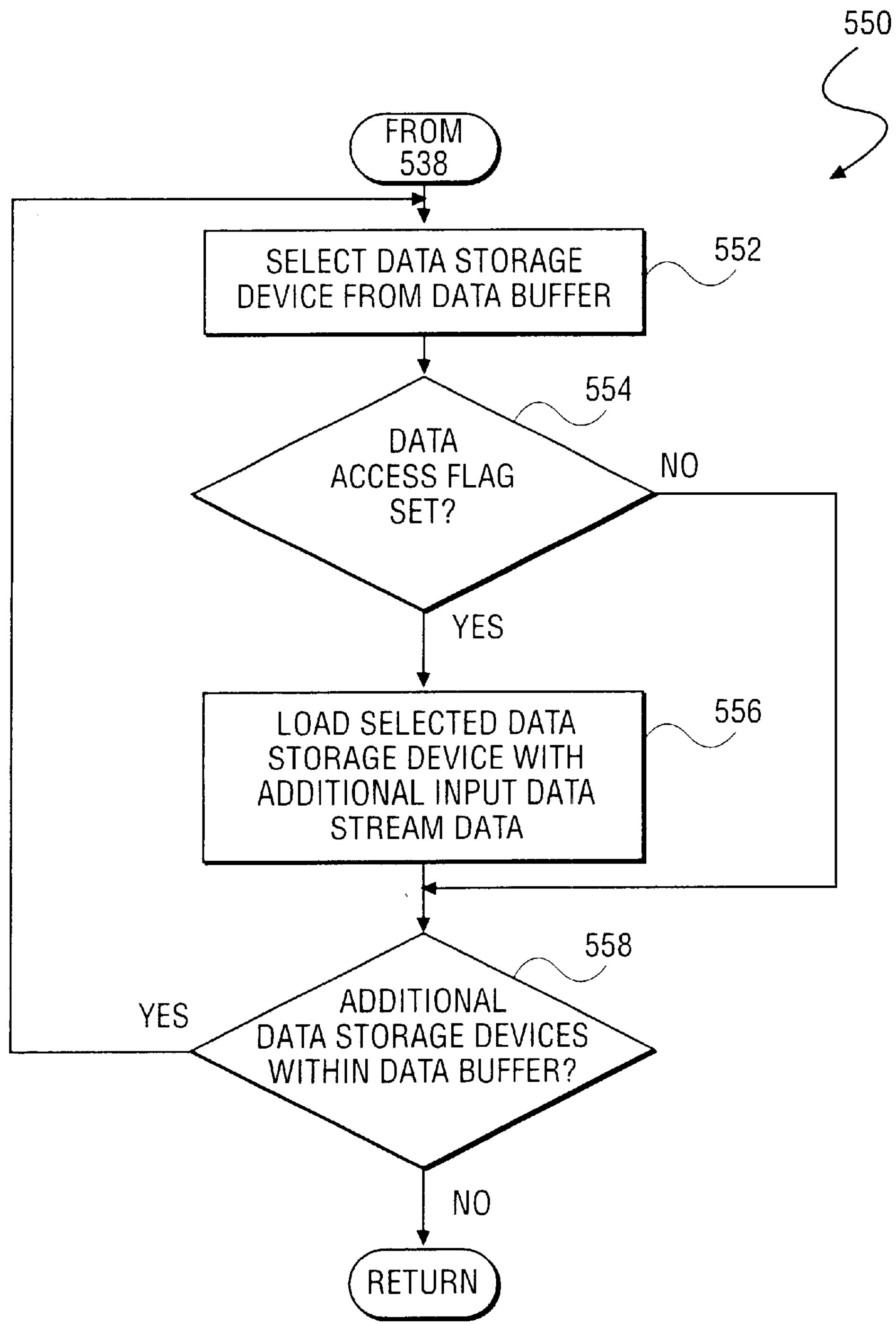
FIG. 13 depicts a flow chart illustrating an additional method for loading data within a data storage device of a data buffer when all data within the data buffer has been accessed in accordance with a further embodiment of the present invention.

Referring now to FIG. 13, FIG. 13 depicts an additional method 550 for loading data within a data storage device of the data buffer once data within the data storage device has been accessed (See FIGS. 5A–5D). As such, at process block 552, a data storage device 304-1 is selected from the data buffer 302. Next, at process block 554, it is determined whether the data access flag 310 is set. When the data access flag 310 is set, at process block 556, data is loaded within the selected data storage device with additional input data stream data. Finally, at process block 558, process blocks 552–556 are repeated for each data storage device within the data buffer.

Figure 14:
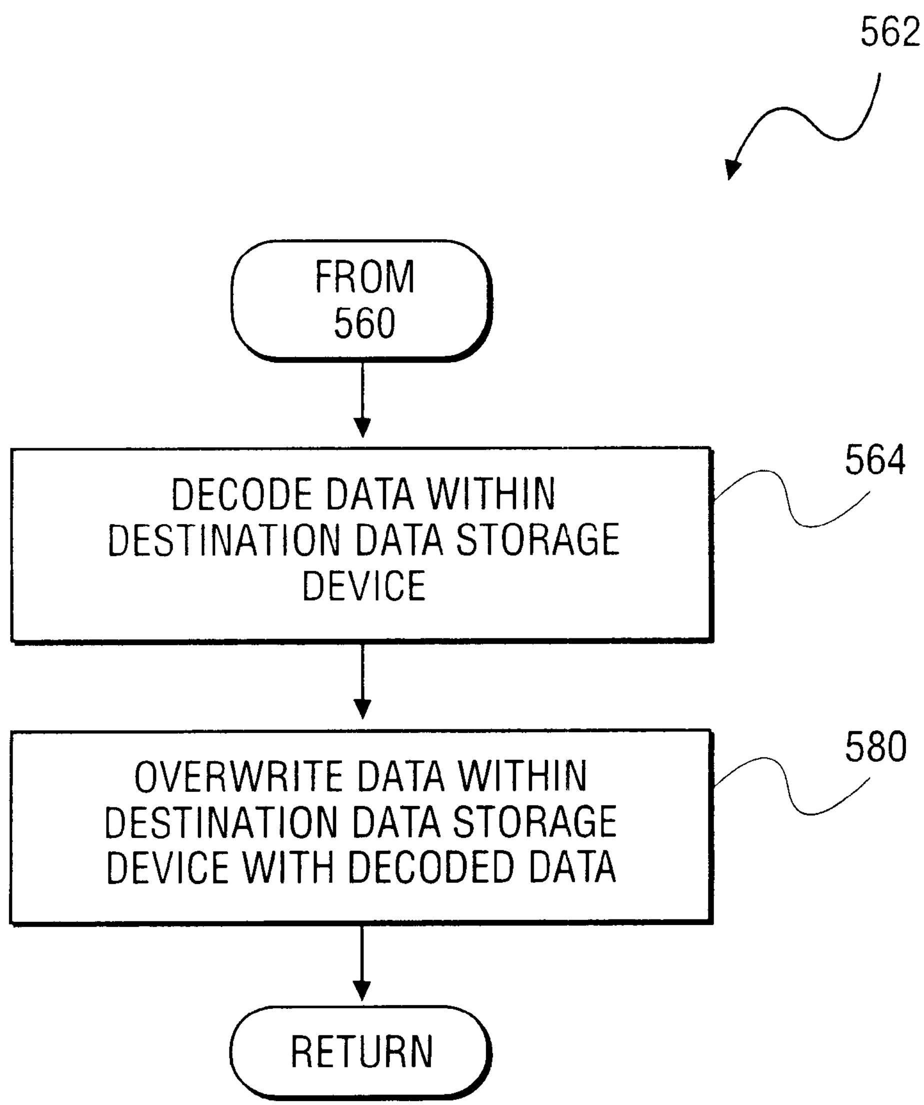
FIG. 14 depicts a flow chart illustrating an additional method for decoding selected data in accordance with a further embodiment of the present invention.

Referring now to FIG. 14, FIG. 14 depicts a flow chart illustrating an additional method 562 for decoding data once stored within the destination data storage device 342 (See FIG. 3B). At process block 564, data within the destination storage device 342 is decoded. Next, at process block 580, data within the destination data storage device is overwritten with the decoded data.

Figure 15:
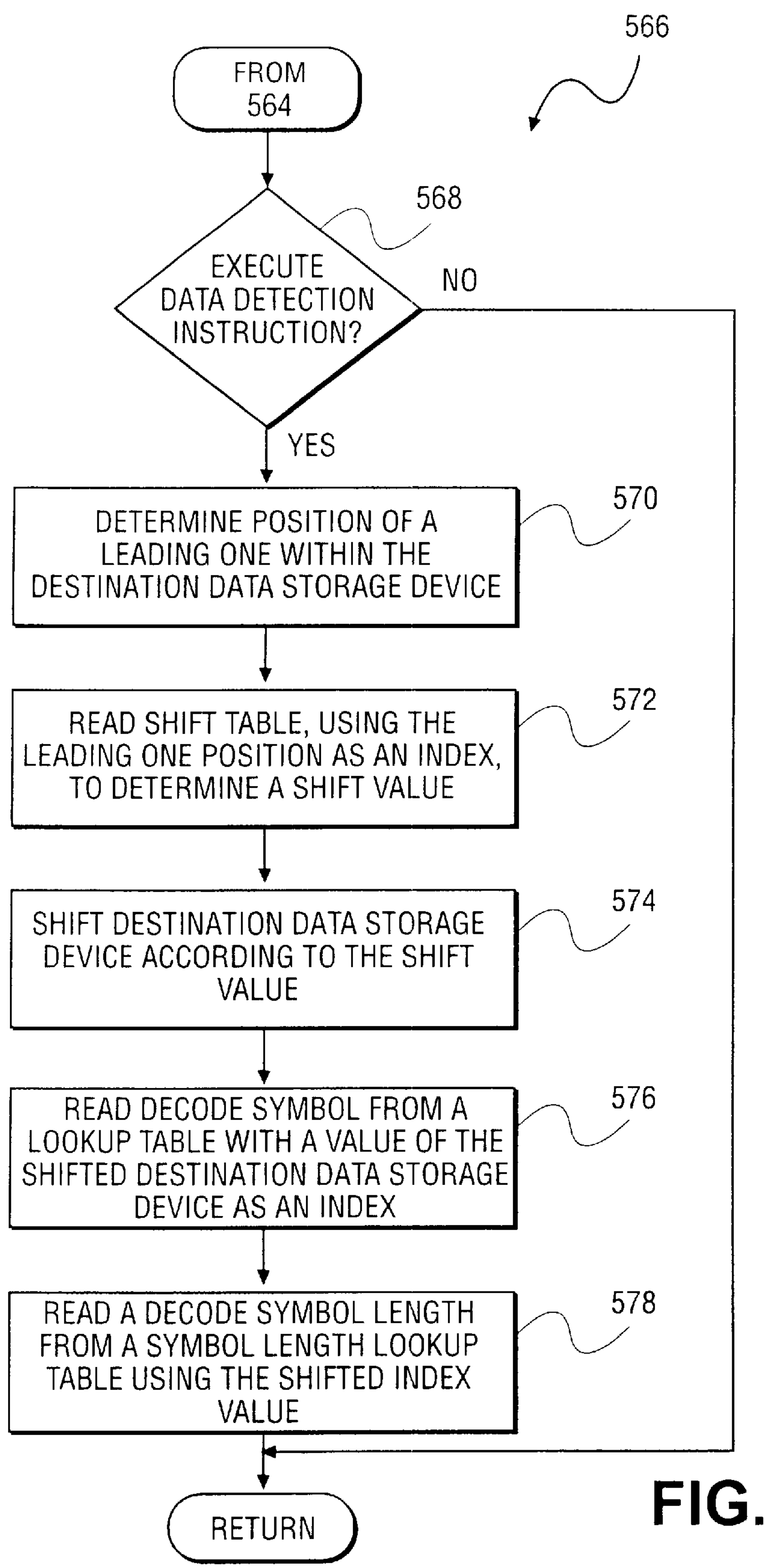
FIG. 15 depicts a flow chart illustrating an additional method for decoding data within a destination data storage device in accordance with an exemplary embodiment of the present invention.

Referring now to FIG. 15, FIG. 15 depicts a flow chart illustrating an additional method 566 for decoding data within a destination data storage device of process block 564 of FIG. 14. At process block 568, it is determined whether a data detection instruction has been executed. In response to execution of a data detection instruction, at process block 570, a position 344 of a leading one is determined within the destination data storage device 342, for example as depicted in FIG. 3B. Next, at process block 572, a shift value is read from a shift table 360 using the leading one position as an index to determine a shift value. At process block 574, the destination data storage device 342 is shifted according to the shift value.

Next, at process block 576, a decode symbol is read from a look-up table 352 based on a value of the shifted destination data storage device as an index (See FIG. 3A). Finally, at process block 578, a decode symbol length is read from a symbol length look-up table 352, also using the shifted data storage device value as an index. As such, the data detection instruction avoids many of the conditional tests utilized by conventional entropy decoders in order to determine the leading one position, which is utilized in order to detect a code word within the received bit stream. Therefore, once the code word is detected, a pointer is utilized to mark the beginning of a next code word within a respective data storage device 304 of the data buffer 302.

Alternatively, as described above with reference to FIG. 3A, the cache 350 may be limited to decode tables 352 which include a codeword length value, a level/magnitude value, and a run length value. As such, in the embodiment described, a mask is applied to the destination data storage device 342 to determine masked/lookup data. Once the masked data is determined, the masked data is used to access a decode table 352 within the cache 350. If the requested data is contained within the table, a codeword length value, a level/magnitude value, and a run length value are extracted from a single datum read from the table. Otherwise, if the data is not contained within the table, the codeword read will indicate the data is not in the table. As such the process is repeated within the remaining tables of the cache 350 until the desired data is located.

Figure 16:
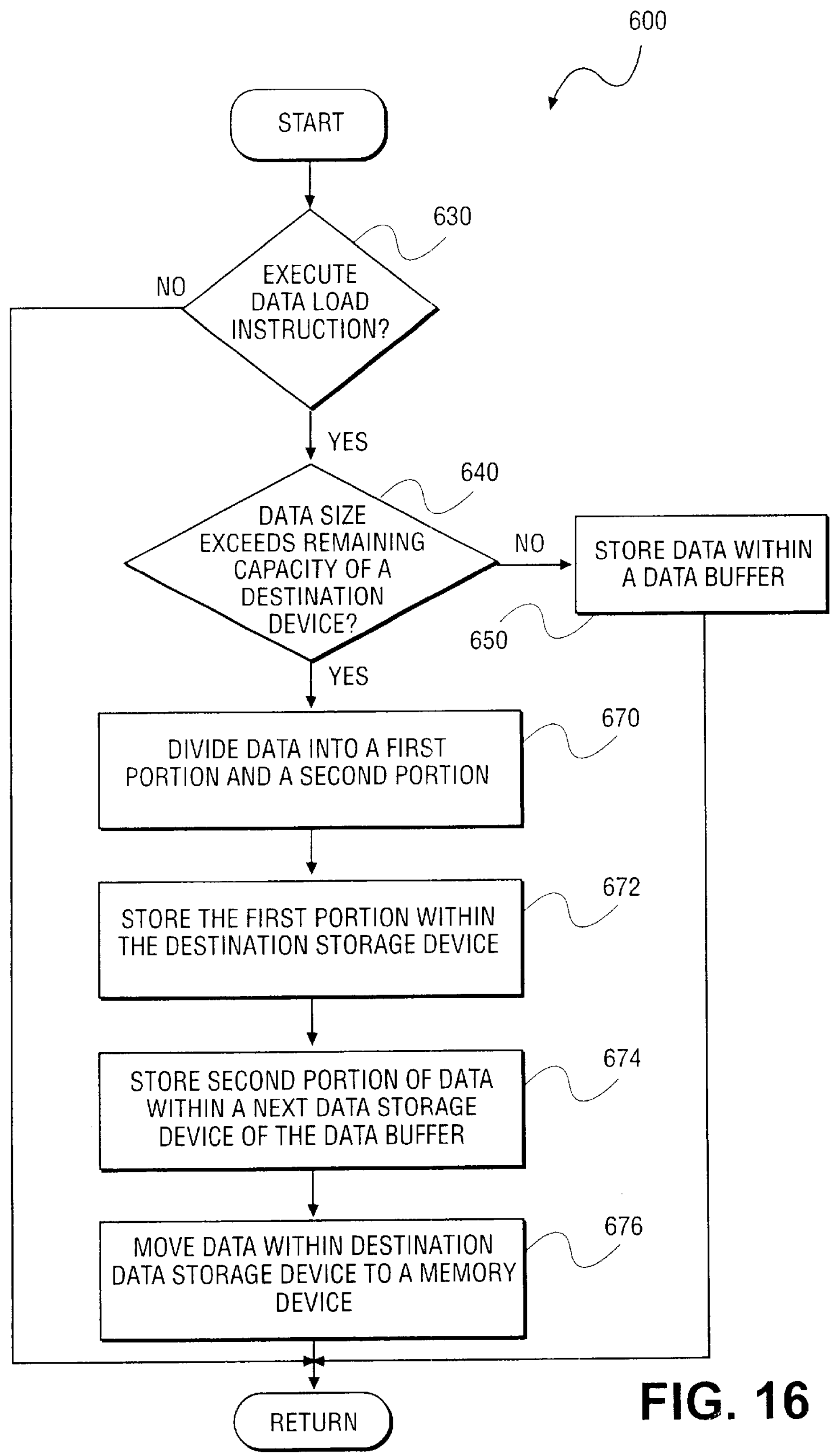
FIG. 16 depicts a flow chart illustrating a method for loading data within a data buffer that includes a plurality of data storage devices in accordance with an embodiment of the present invention.

Referring now to FIG. 16, FIG. 16 depicts a method 600 for storing data within a bit-level addressable data buffer 480, for example as depicted in FIGS. 7A and 7B. At process block 630, it is determined whether a data load instruction has been executed. In response to execution of a data load instruction, at process block 640 it is determined whether a data size 494 of the data 492 to be loaded exceeds a remaining capacity 484 of a destination data storage device 482-1 within the data buffer 480. When such is the case, process block 670 is performed.

Otherwise, the data is loaded or stored within the destination data storage device 482 of the data buffer 480. At process block 670, the data 494 is divided into a first portion 496 and a second portion 498. Once divided, at process block 672, the first portion 496 is loaded within the destination data storage device 482-1. Next, the second portion of the data 498 is loaded within a next data storage device of the data buffer (See FIG. 7B). Finally, at process block 676, data is moved within the destination data storage device 482-1 to, for example, a memory device 490.

Figure 17:
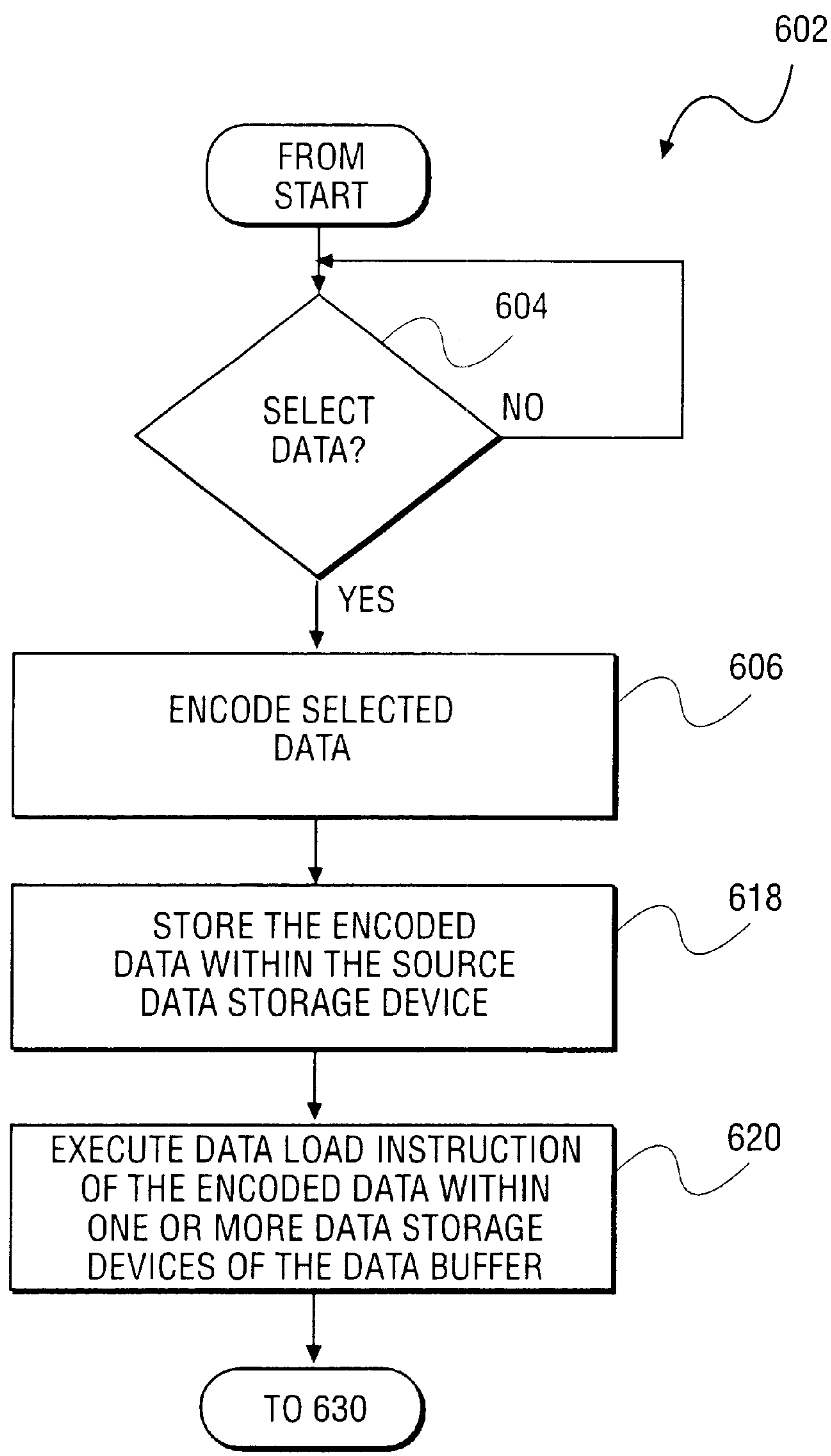
FIG. 17 depicts a flow chart illustrating encoding of data prior to loading within the data buffer in accordance with the further embodiment of the present invention.

Referring now to FIG. 17, FIG. 17 depicts an additional method 602 for encoding of data prior to storing of the data within the bit-level addressable data buffer 480. At process block 604, data 418 is selected from a source data storage device. Once selected, at process block 606, the selected data is encoded. Next, at process block 618, the encoded data is stored in a source data storage device. Finally, at process block 620, execution of a data load instruction is performed for loading the encoded data within one or more data storage devices of the data buffer. Once executed, control flow branches to process block 630 of FIG. 16.

Figure 18:
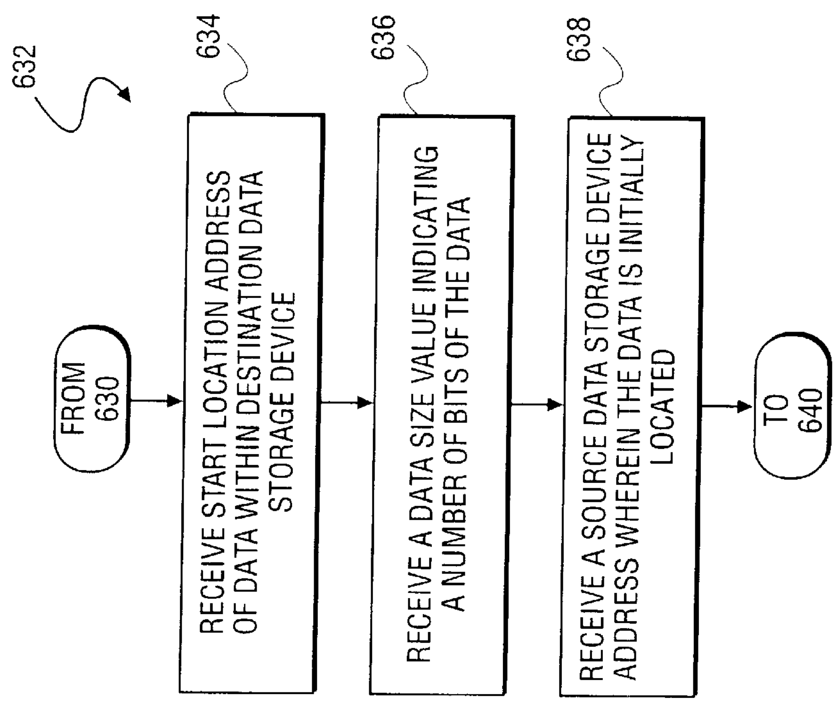
FIG. 18 depicts a flow chart illustrating an additional method performed in response to execution of a data load instruction in accordance with the further embodiment of the present invention.

Referring now to FIG. 18, FIG. 18 depicts a flow chart illustrating an additional method 632 performed in response to execution of a data load instruction. At process block 634, a start address location of data within a destination data storage device 482 of the data buffer 480 is received. Next, at process block 636, a data size value indicating a number of bits of the data to be stored within the destination data storage device 482 is received. Finally, at process block 638, a source data storage device address wherein the data is initially located is received. Once received, control flow branches to process block 640 of FIG. 16.

Figure 19:
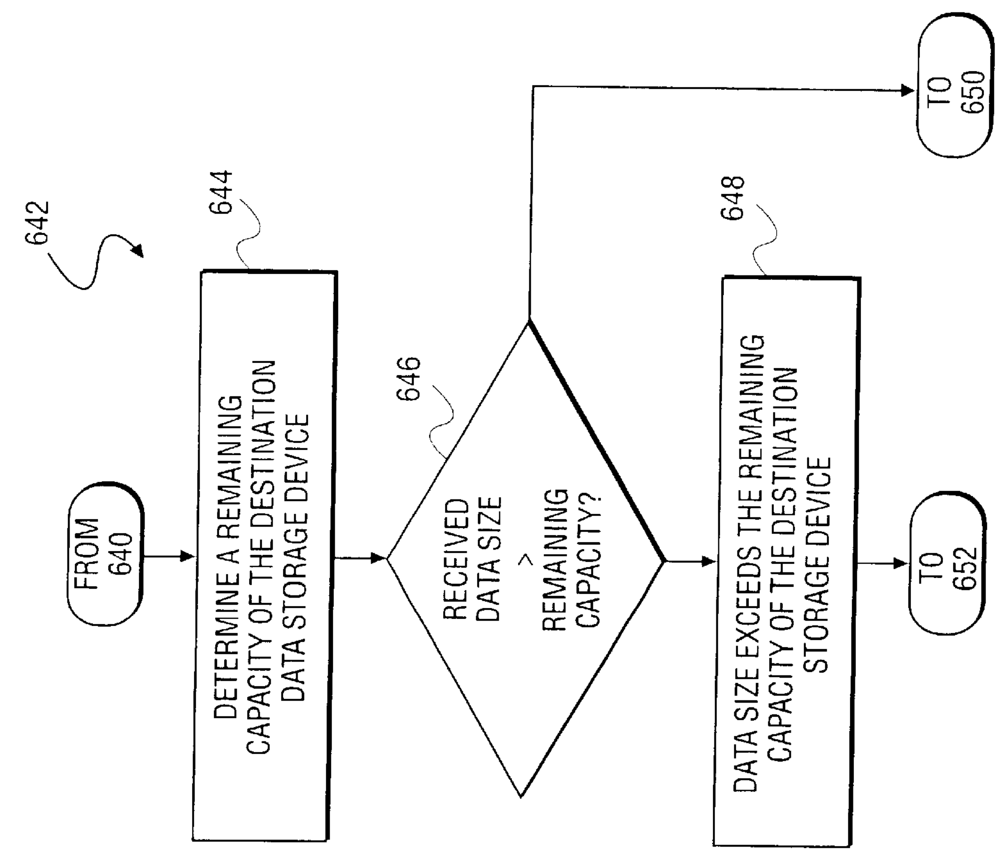
FIG. 19 depicts a flow chart illustrating an additional method for determining whether the data to be loaded exceeds the capacity of a destination data storage device within the data buffer in accordance with the further embodiment of the present invention.

Referring now to FIG. 19, FIG. 19 depicts a flow chart illustrating an additional method 642 for determining whether a data size of the data to be loaded exceeds the remaining capacity of a destination device 482-1 within the data buffer 480 as depicted in FIG. 7B. Accordingly, at process block 644, the remaining capacity 484 of a current destination data storage device 482-1 within the data buffer 480 is determined. Next, at process block 646, it is determined whether the received data size 494 is greater than the remaining capacity 484. When such is the case, process block 640 is performed. Otherwise, control flow branches to process block 650 of FIG. 16.

At process block 648, the data size exceeds 494 the remaining capacity 484 of the destination storage device 482-1. Accordingly, the data must be divided into a first portion 496 and a second portion 498 at process block 640, as depicted in FIG. 16. The division is accomplished by selecting a number of bits from the received data 492 equal to a remaining capacity 484 of the destination data storage device 482-1. The selected data forms the first portion 496 of data 492, which will be stored within the destination data storage device. Next, the remaining portion of the data 492 is utilized as a second portion 498, such that the second portion 498 may be stored within a next data storage device 482-2 of the data buffer 480. Accordingly, the ability to divide data enables the data buffer to function as a single address space, such that once a respective data storage device within the data buffer is filled, the data may be written to memory.

Figure 20:
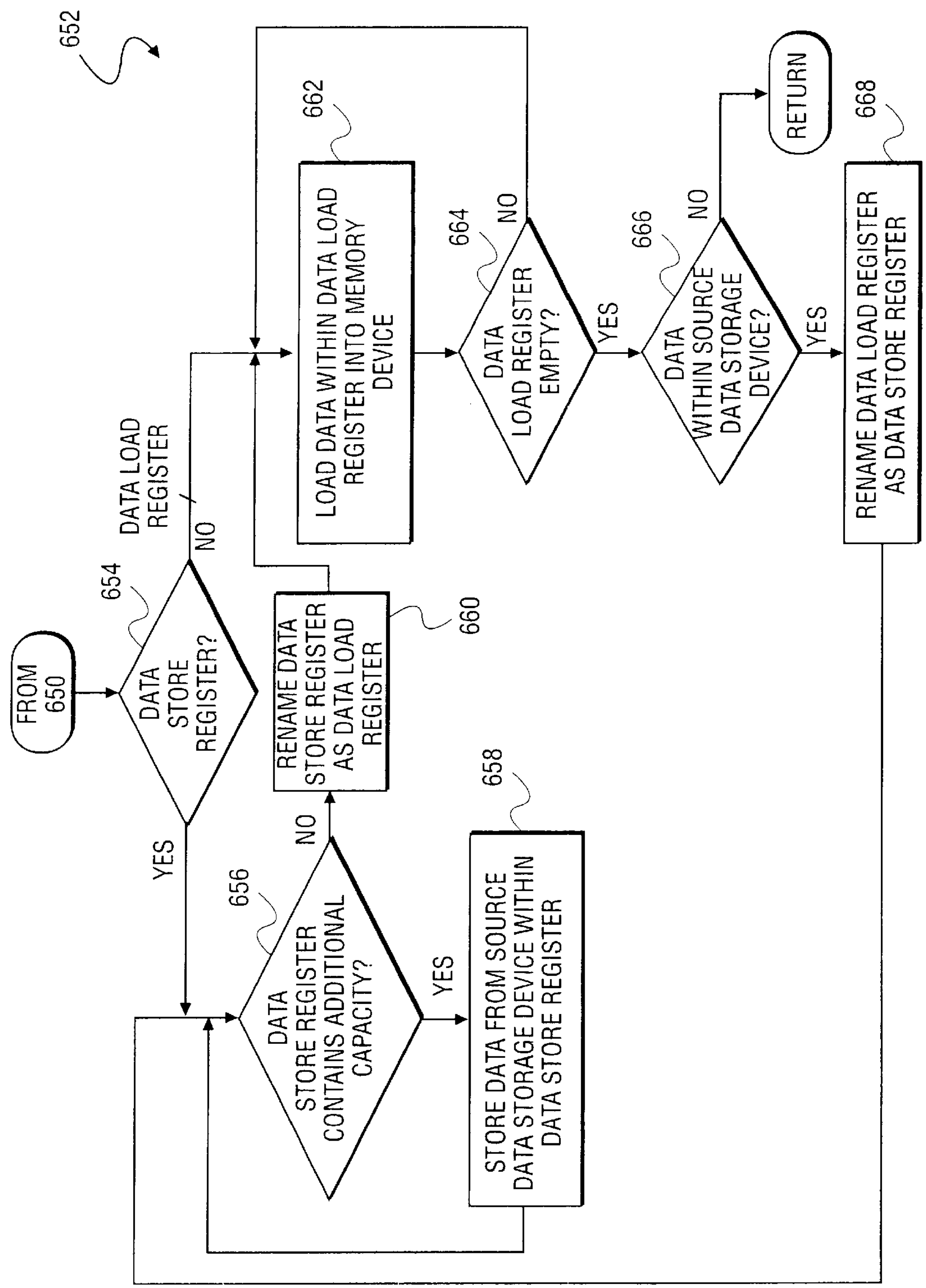
FIG. 20 depicts a flow chart illustrating a method for loading data within a data buffer that includes a data store register and a data load register in accordance with an exemplary embodiment of the present invention.

Referring now to FIG. 20, FIG. 20 depicts a method wherein the data buffer 480, for example as depicted in FIG. 3A and FIG. 7B, utilizes a data store register 482-1 and a data load register 482-2 as the plurality of registers within the data buffer 480. Accordingly, in response to a data access instruction to store data within the data buffer 480, it is determined whether the current register within the data buffer 480 is the data store register 482-1. When such is the case, process block 656 is performed. At process block 656, it is determined whether the data store register 482-1 contains additional capacity. When the data store register 482-1 contains additional capacity, process block 658 is performed.

At process block 658, data from a source data storage device is stored within the data store register 482-1. Otherwise, the data store register 482-1 is full and must now function as a data load register 482-1. As described herein, a data load register 482-2 is utilized in a data buffer 480 which functions as a circular buffer, such that the data load register 482-2 is completely filled with data and therefore requires that the data be written to memory 490. In contrast, a data store register is a data register which contains additional capacity and in which received data in response to execution of the data load instruction is loaded.

Consequently, at process block 660, the data store register, once full, is renamed as the data load register. Next, at process block 662, data within the data load register is stored within a memory device 490. Next, at process block 664, it is determined whether the data load register 482-2 is empty. As such, process block 662 is repeated until the data load register 482-2 is empty. Once the data load register 482-2 is empty, process block 666 is performed. At process block 666, it is determined whether there is additional data within the source data storage device. When additional data is within the source data storage device, the data load register 482-2 is renamed as the data store register 482-1 such that additional data may be loaded. Otherwise, control flow returns to process block 650, as depicted in FIG. 17, wherein the method terminates.

Figure 21:
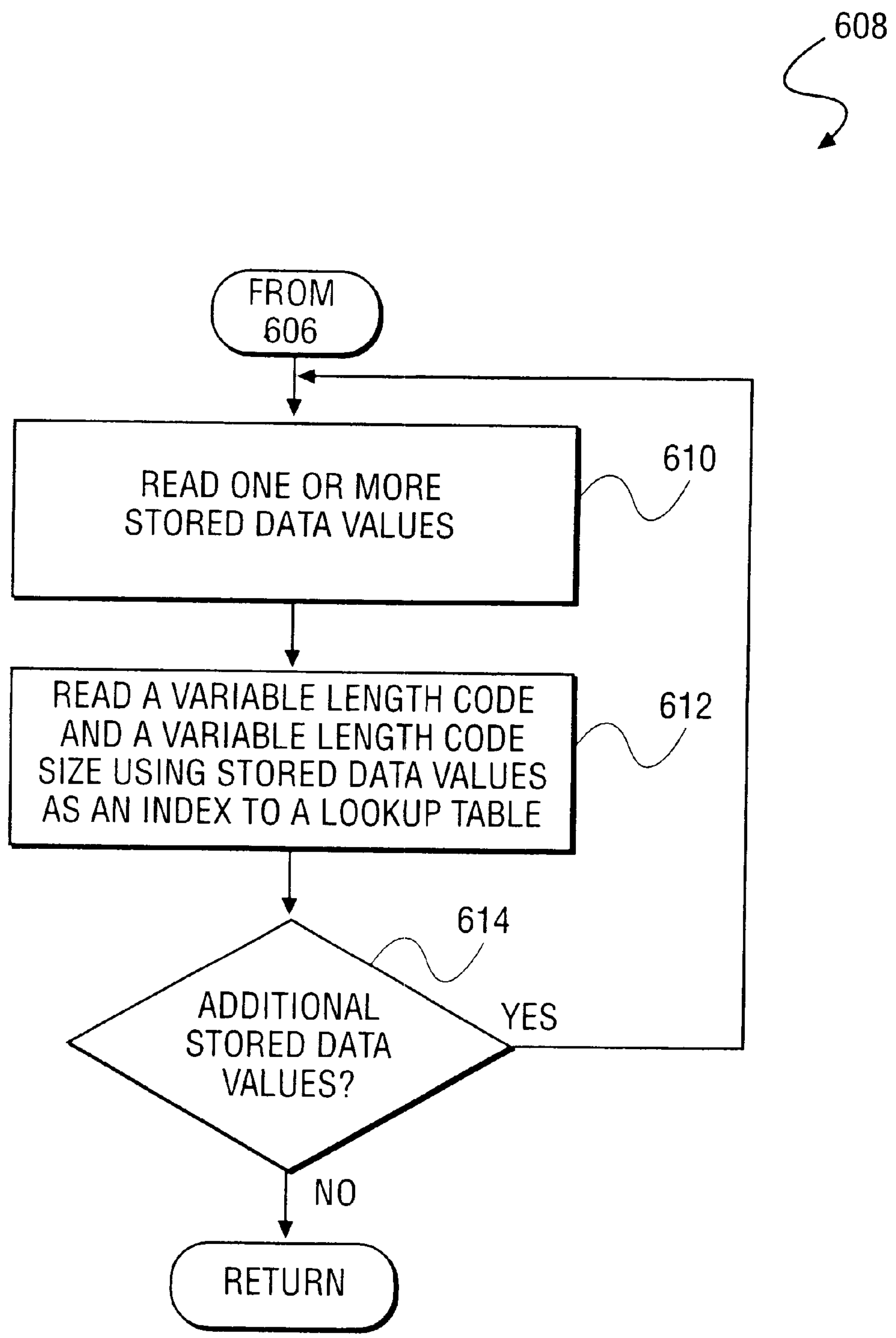
FIG. 21 depicts a flow chart illustrating an additional method for encoding data, which is selected from a memory device in accordance with a further embodiment of the present invention.

Finally, referring to FIG. 21, FIG. 21 depicts a flow chart illustrating an additional method for encoding selected data of process block 606, as depicted in FIG. 17. At process block 610, one or more stored data values are read. Next, at process block 612, a variable length code symbol and variable length code size are read from symbol look-up tables, as depicted in FIG. 7A. As known to those skilled in the art, encode symbols and lengths are generated based on a frequency of data elements within the data stream. Finally, at process block 614, process blocks 610 and 612 are repeated for each stored data value.

Alternate Embodiments

Several aspects of one implementation of the bit-level addressable data buffer for providing improved entropy encoding/decoding have been described. However, various implementations of the bit-level addressable buffer provide numerous features including, complementing, supplementing, and/or replacing the features described above. Features can be implemented as part of an image processing system or as part of a hardware/software encoder/decoder in different implementations. In addition, the foregoing description, for purposes of explanation, used specific nomenclature to provide a thorough understanding of the invention. However, it will be apparent to one skilled in the art that the specific details are not required in order to practice the invention.

In addition, although an embodiment described herein is directed to a bit-level addressable buffer, it will be appreciated by those skilled in the art that the teaching of the present invention can be applied to other systems. In fact, systems for buffering of bit-level operations are within the teachings of the present invention, without departing from the scope and spirit of the present invention. The embodiments described above were chosen and described in order to best explain the principles of the invention and its practical applications. These embodiment were chosen to thereby enable others skilled in the art to best utilize the invention and various embodiments with various modifications as are suited to the particular use contemplated.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the present invention to the full extent indicated by the broad general meaning of the terms in which the appended claims are expressed.

The present invention provides many advantages over known techniques. The present invention includes the ability to speed up applications that utilize or require the access of bits and intensive bit manipulations. The methods described herein achieve improved efficiency and higher performance (speed) in manipulating and extracting data from a register used as a buffer, thereby speeding up entropy encoding and decoding.

Features of the present invention provide performance advantages for a variety of applications involving bit access and manipulations such as fast byte order reversal operations that facilitate efficient little endian to big endian conversion. In addition, the data buffer holds data that can be accessed and stored on bit boundaries, based on quantities of data that are accessed, stored and measured in bits and not bytes. The buffer may include multiple registers that that operate as a circular buffer. When a sequence of bits are accessed from one register, data in another register can be loaded from memory. Consequently, when a sequence of bits is stored in one register data in another can be stored in memory.

A sequence of bits loaded from the data buffer or stored within the data buffer can span multiple registers. Finally, an instruction determines the position of the leading one in the data accessed from the bit buffer. The position of the leading one may be used to determine the number of bits to shift bits in the destination register. This is done with one instruction and avoids conditional branches in the conventional entropy decode implementation. The resulting data in the destination register is used to access a lookup table. The bit buffer may also permit unrolling the loop software optimization.

Having disclosed exemplary embodiments and the best mode, modifications and variations may be made to the disclosed embodiments while remaining within the scope of the invention as defined by the following claims.

What is claimed is:

1. A method comprising:

selecting, in response to executing a data access instruction, requested data from a data buffer, wherein the data buffer includes a plurality of data storage devices which initially contain input data including the requested data;

when the requested data spans from a source data storage device to a next data storage device of the data buffer, concatenating a portion of the requested data selected from the source data storage device and a remaining portion of the requested data from the next data storage device to form the requested data as a contiguous unit; and storing the requested data within a destination data storage device.

2. The method of claim 1, wherein prior to selecting data, the method further comprises:

loading, in response to executing a data load instruction, the data buffer with the input data from an input data stream that spans the plurality of data storage devices within the data buffer; and when a data conversion instruction is received, reversing, in response to executing the data conversion instruction, an order of the input data loaded within the data buffer.

3. The method of claim 1, wherein concatenating further comprising:

when each portion of the input data within one or more data storage devices of the data buffer has been accessed, updating a data access flag for each data storage device with completely accessed data;

selecting a data storage device from the plurality of data storage devices of the data buffer;

when a data access flag of the data storage device is set, loading the selected data storage device with additional data from the input data stream;

once loading of the data storage device is complete, updating the data access flag for the selected data storage device; and repeating the selecting, loading and updating for each data storage device of the data buffer.

4. The method of claim 1, further comprising:

decoding data contained within the destination data storage device; and overwriting the data within the destination data storage device with the decoded data.

5. The method of claim 4, wherein decoding data further comprises:

determining, in response to executing a data detection instruction, a position of a leading one within the destination data storage device;

reading a shift table to determine a shift value using the position of the leading one as an index;

shifting the destination data storage device based on the shift value;

reading a decode symbol from a lookup table using a value of the shifted destination data storage device as an index; and reading a decode symbol length in a symbol lookup table using the value of the shifted destination data storage device as an index.

6. The method of claim 1, wherein selecting further comprises:

receiving a device value indicating a source data storage device within the data buffer;

receiving a bit address within the source data storage device wherein a first bit of the data is located, such that the data buffer is addressable at a bit-level; and receiving a bit-value indicating a number of bits to be read from the source data storage device, wherein whether data spans one or more data storage devices of the data buffer is determined based on the bit address of the source data storage device and the bit-value of the data, such that when the last bit of the data is in the next data storage device from the source data storage device, the data spans to the next data storage device.

7. The method of claim 1, wherein storing the selected data within a destination storage device further comprises:

receiving an address of the destination data storage device;

storing the data beginning at a least significant position of the destination storage device; and zero extending an empty portion of the destination storage device, such that bits in the empty portion are set to zero.

8. The method of claim 1, wherein loading the data buffer further comprises:

receiving an address of data in a memory device wherein input data stream data is located; and accessing the input data stream data from the received memory address.

9. The method of claim 1, further comprising:

unrolling, in response to executing a loop unroll instruction, the data buffer a predetermined number of times based on a count of the plurality of data storage devices utilized by the data buffer less one, divided by a maximum number of bits accessed from the data buffer at any one time.

10. A method comprising:

storing, in response to executing a data load instruction, input data within a data buffer from a source data storage device, wherein the data buffer includes a plurality of destination data storage devices;

when a size of the input data exceeds a remaining capacity of a destination data storage device within the data buffer, dividing the data into a first portion and a second portion;

storing the first portion of data within the destination data storage device;

storing the second portion of data within one or more next destination data storage device of the data buffer; and once storing of the data within the data buffer device is complete, moving data, within the data buffer, to a memory device.

11. The method of claim 10, wherein prior to storing, the method further comprises:

selecting content data requiring encoding;

encoding the select data to form encoded data;

storing the encoded data within the source data storage device; and executing a data load instruction of the encoded data within the destination data storage devices of the data buffer.

12. The method of claim 11, wherein encoding further comprises:

determining a data frequency value of each data element of the selected content data;

selecting a respective encode symbol length for each data element based on a respective data frequency value;

selecting a respective encode symbol for each data element of the selected content data based on a respective symbol length of each data element to form one or more codewords as the encoded data; and overwriting the source data storage device with the one or more codewords.

13. The method of claim 10, wherein storing further comprises:

receiving a bit address indicating a start location within a destination data storage device of the data buffer wherein the data is to be stored, such that the data buffer is addressable at a bit-level;

receiving a data size value indicating a number of bits of the data; and receiving an address of the source data storage device wherein the data is initially contained.

14. The method of claim 10, wherein dividing the data further comprises:

determining a remaining capacity of the destination data storage device;

comparing the remaining capacity of the destination data storage device against a received data size; and when the data size exceeds the remaining capacity of the selected data storage device, dividing the data into the first portion with a size equal to the remaining capacity of the destination data storage device and the second portion containing a remaining portion of the data.

15. The method of claim 10, wherein the data buffer includes a data store register and a data load register as the plurality of data storage devices, further comprising:

while the data store register contains additional capacity, storing data from the source data storage device into the data store register;

while data is stored in the data store register, loading data within the data load register into the memory device;

once loading of data into the memory device is complete, storing data from the source data storage device within the data load register; and once the data store register is full, loading data within the data store register into the memory device, such that the data load register is renamed to function as a data store register in order to store data from the source data storage device, and the data store register is renamed to function as a data load register in order to load stored data into the memory device.

16. A machine readable storage medium including program instructions that direct a system to function in a specified manner when executed by a processor, the program instructions comprising:

selecting, in response to executing a data access instruction, requested data from a data buffer, wherein the data buffer includes a plurality of data storage devices which initially contain input data including the requested data;

when the requested data spans from a source data storage device to a next data storage device of the data buffer, concatenating a portion of the selected data from the source data storage device and a remaining portion of the requested data from the next data storage device to form the requested data as a contiguous unit; and storing the requested data within a destination data storage device.

17. The machine readable storage medium of claim 16, wherein prior to selecting data, the method further comprises:

loading, in response to executing a data load instruction, the data buffer with the input data from an input data stream that spans the plurality of data storage devices within the data buffer; and when data conversion instruction is received, reversing, in response to executing the data conversion instruction, an order of the input data loaded within the data buffer.

18. The machine readable storage medium of claim 16, wherein concatenating further comprising:

when each portion of input data within one or more data storage devices of the data buffer has been accessed, updating a data access flag for each data storage device with completely accessed data;

selecting a data storage device from the plurality of data storage devices of the data buffer;

when a data access flag of the data storage device is set, loading the selected data storage device with additional data from the input data stream;

once loading of the data storage device is complete, updating the data access flag for the selected data storage device; and repeating the selecting, loading and updating for each data storage device of the data buffer.

19. The machine readable storage medium of claim 16, further comprising:

decoding data contained within the destination data storage device; and overwriting the data within the destination data storage device with the decoded data.

20. The machine readable storage medium of claim 19, wherein decoding data further comprises:

determining, in response to executing a data detection instruction, a position of a leading one within the destination data storage device;

reading a shift table to determine a shift value using the position of the leading one as an index;

shifting the destination data storage device based on the shift value;

reading a decode symbol from a lookup table using a value of the shifted destination data storage device as an index; and reading a decode symbol length in a symbol lookup table using the value of the shifted destination data storage device as an index.

21. The machine readable storage medium of claim 16, wherein selecting further comprises:

receiving a device value indicating a source data storage device within the data buffer;

receiving a bit address within the source data storage device wherein a first bit of the data is located, such that the data buffer is addressable at a bit-level; and receiving a bit-value indicating a number of bits to be read from the source data storage device, wherein whether data spans one or more data storage devices of the data buffer is determined based on the bit address of the source data storage device and the bit-value of the data, such that when the last bit of the data is in the next data storage device from the source data storage device, data spans to the next data storage device.

22. The machine readable storage medium of claim 16, wherein storing the selected data within a destination storage device further comprises:

receiving an address of the destination data storage device;

storing the data beginning at a least significant position of the destination storage device; and zero extending an empty portion of the destination storage device, such that bits in the empty portion are set to zero.

23. The machine readable storage medium of claim 16, wherein loading the data buffer further comprises:

receiving an address of data in a memory device wherein input data stream data is located; and accessing the input data stream data from the received memory address.

24. The machine readable storage medium of claim 16, further comprising:

unrolling, in response to executing a loop unroll instruction, the data buffer a predetermined number of times based on a count of the plurality of data storage devices utilized by the data buffer less one, divided by a maximum number of bits accessed from the data buffer at any one time.

25. A machine readable storage medium including program instructions that direct a system to function in a specified manner when executed by a processor, the program instructions comprising:

storing, in response to executing a data load instruction, input data within a data buffer from a source data storage device, wherein the data buffer includes a plurality of data storage devices;

when a size of the input data exceeds a remaining capacity of a destination data storage device within the data buffer, dividing the data into a first portion and a second portion;

storing the first portion of data within the destination data storage device, storing the second portion of data within one or more next data storage device of the data buffer; and once storing of the data within the data buffer is complete, moving data, within the destination data storage device, to a memory device.

26. The machine readable storage medium of claim 25, wherein prior to storing, further comprising:

selecting content data requiring encoding;

encoding the select data to form encoded data;

storing the encoded data within the source data storage device; and executing a data load instruction of the encoded data within the destination data storage device of the data buffer.

27. The machine readable storage medium of claim 26, wherein encoding further comprises:

determining a data frequency value of each data element of the selected content data;

selecting a respective encode symbol length for each data element based on a respective data frequency value;

selecting a respective encode symbol for each data element of the selected content data based on a respective symbol length of each data element to form one or more codewords as the encoded data; and overwriting the source data storage device with the one or more codewords.

28. The machine readable storage medium of claim 25, wherein storing further comprises:

receiving a bit address indicating a start location within a destination data storage device of the data buffer wherein the data is to be stored, such that the data buffer is addressable at a bit-level;

receiving a data size value indicating a number of bits of the data; and receiving an address of the source data storage device wherein the data is initially contained.

29. The machine readable storage medium of claim 25, wherein dividing the data further comprises:

determining a data frequency value of each data element of the selected content data;

selecting a respective encode symbol length for each data element based on a respective data frequency value;

selecting a respective encode symbol for each data element of the selected content data based on a respective symbol length of each data element to form one or more codewords as the encoded data; and overwriting the source data storage device with the one or more codewords.

30. The machine readable storage medium of claim 25, wherein the data buffer includes a data store register and a data load register as the plurality of data storage devices, further comprising:

while the data store register contains additional capacity, storing data from the source data storage device into the data store register;

while data is stored in the data store register, loading data within the data load register into the memory device;

once loading of data into the memory device is complete, storing data from the source data storage device within the data load register; and once the data store register is full, loading data within the data store register into the memory device, such that the data load register is renamed to function as a data store register in order to store data from the source data storage device, and the data store register is renamed to function as a data load register in order to load stored data into the memory device.

31. An apparatus, comprising:

a processor having circuitry to execute instructions;

a data buffer including a plurality of source data storage devices; and a storage device coupled to the processor, having sequences of instructions stored therein, which when executed by the processor cause the processor to:

select, in response to executing a data access instruction, requested data from a source data storage device of the data buffer, when the requested data spans from the source data storage device to a next source data storage device of the data buffer, concatenate a portion of the data requested from the source data storage device and a remaining portion of the data requested from the next data storage device to form the requested data as a contiguous unit, and store the selected data within a destination data storage device.

32. The apparatus of claim 31, wherein the processor is further caused to:

store, in response to executing a data load instruction, input data within a destination data storage device of the data buffer from a source data storage device;

when a size of the input data exceeds a remaining capacity of the destination data storage, divide the data into a first portion and a second portion;

store the first portion of data within the destination data storage device;

store the second portion of data within one or more next data storage device of the data buffer; and once storing of the data within the data buffer is complete, move data, within the destination data storage device, to a memory device.

33. The apparatus of claim 31, wherein the instruction to concatenate further causes the processor to:

when each portion of data within one or more data storage devices of the data buffer has been accessed, set a data access flag for each data storage device with completely accessed data;

select a data storage device from the plurality of data storage devices of the data buffer;

when a data access flag of the data storage device is set, load the selected data storage device with data from an input data stream;

once loading of the data storage device is complete, reset the data access flag for the selected data storage device; and repeat the selecting, loading and resetting for each data storage device of the data buffer.

34. The apparatus of claim 32, wherein the data buffer includes a data store register and a data load register as the plurality of data storage devices, and wherein the processor is further caused to:

while the data store register contains additional capacity, store data from the source data storage device into the data store register;

while data is stored in the data store register, load data within the data load register into the memory device;

once loading of data into the memory device is complete, store data from the source data storage device within the data load register; and once the data store register is full, load data within the data store register into memory, such that the data load register is renamed to function as a data store register in order to store data from the source data storage device, and the data store register is renamed to function as a data load register in order to load stored data into the memory device.

35. The apparatus of claim 31, wherein the data buffer includes a bit-level address capability, such that the plurality of data storage devices form a single bit-level addressable address space.

* * * * *

UNITED STATES PATENT AND TRADEMARK OFFICE
CERTIFICATE OF CORRECTION

PATENT NO. : 6,781,589 B2
DATED : August 24, 2004
INVENTOR(S) : Macy et al.

It is certified that error appears in the above-identified patent and that said Letters Patent is hereby corrected as shown below:

Column 9,
Line 22, delete "$R_1$ 304-1" and insert -- $R_0$ 304-1 --.

Signed and Sealed this

First Day of March, 2005

JON W. DUDAS
*Director of the United States Patent and Trademark Office*